US010447378B1

(12) United States Patent
Kim et al.

(10) Patent No.: US 10,447,378 B1
(45) Date of Patent: Oct. 15, 2019

(54) WIRELESS MESH NETWORK FOR BROADBAND CONNECTIVITY

(71) Applicant: AMAZON TECHNOLOGIES, INC., Seattle, WA (US)

(72) Inventors: Jin Dong Kim, Santa Clara, CA (US); Sang Eun Lee, San Jose, CA (US); In Chul Hyun, San Jose, CA (US); Cheol Su Kim, San Jose, CA (US); Subram Narasimhan, Saratoga, CA (US); Varadarajan Gopalakrishnan, Cupertino, CA (US); Omar Fawazhashim Zakaria, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 389 days.

(21) Appl. No.: 15/260,024

(22) Filed: Sep. 8, 2016

Related U.S. Application Data

(60) Provisional application No. 62/327,357, filed on Apr. 25, 2016.

(51) Int. Cl.
| | |
|---|---|
| *H04B 7/155* | (2006.01) |
| *H04W 76/14* | (2018.01) |
| *H04W 76/15* | (2018.01) |
| *H04W 84/18* | (2009.01) |
| *H04W 4/021* | (2018.01) |

(52) U.S. Cl.
CPC ........ *H04B 7/15507* (2013.01); *H04W 76/14* (2018.02); *H04W 76/15* (2018.02); *H04W 4/021* (2013.01); *H04W 84/18* (2013.01)

(58) Field of Classification Search
CPC ........ H04B 7/15507; H04W 76/14–15; H04W 84/18; H04W 4/021
See application file for complete search history.

(56) References Cited

U.S. PATENT DOCUMENTS

| | | | |
|---|---|---|---|
| 2007/0076649 A1* | 4/2007 | Lin ....................... | H04W 76/15 370/328 |
| 2009/0047930 A1* | 2/2009 | Krishnaswamy ... | H04L 41/5009 455/411 |
| 2012/0327851 A1* | 12/2012 | Wentink ................ | H04W 76/14 370/328 |
| 2013/0198305 A1* | 8/2013 | Veillette .................. | H04L 51/00 709/206 |

(Continued)

*Primary Examiner* — Hassan Kizou
*Assistant Examiner* — Hector Reyes
(74) *Attorney, Agent, or Firm* — Lowenstein Sandler LLP

(57) ABSTRACT

Network hardware devices organized in a wireless mesh network (WMN) in which a home access node (HAN) device that includes a first set of radios, each of the first set of radios being coupled to a beam-steering antenna and each of the first set of radios establishing a first point-to-point (PtP) wireless connection over which the HAN relay device communicates with a second HAN relay device in a first sub-mesh network of HAN relay devices. The HAN device also includes a second set of radios, each of the second set of radios being coupled to a beam-steering antenna and each of the second set of radios establishing a second PtP wireless connection over which the HAN relay device communicates with at least one of a plurality of HAN devices in a second sub-mesh network in the WMN.

19 Claims, 19 Drawing Sheets

(56) References Cited

U.S. PATENT DOCUMENTS

2013/0201847 A1* 8/2013 Chincholi ............ H04W 28/08
                                                   370/252
2016/0337177 A1* 11/2016 Lindoff ................ H04W 16/14
2017/0202046 A1*  7/2017 Lee ........................ H04W 4/08

* cited by examiner

WIRELESS MESH NETWORK FOR BROADBAND CONNECTIVITY

RELATED APPLICATIONS

This application claims the benefit of U.S. Application No. 62/327,357, filed Apr. 25, 2016, the entire contents of which are incorporated herein by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
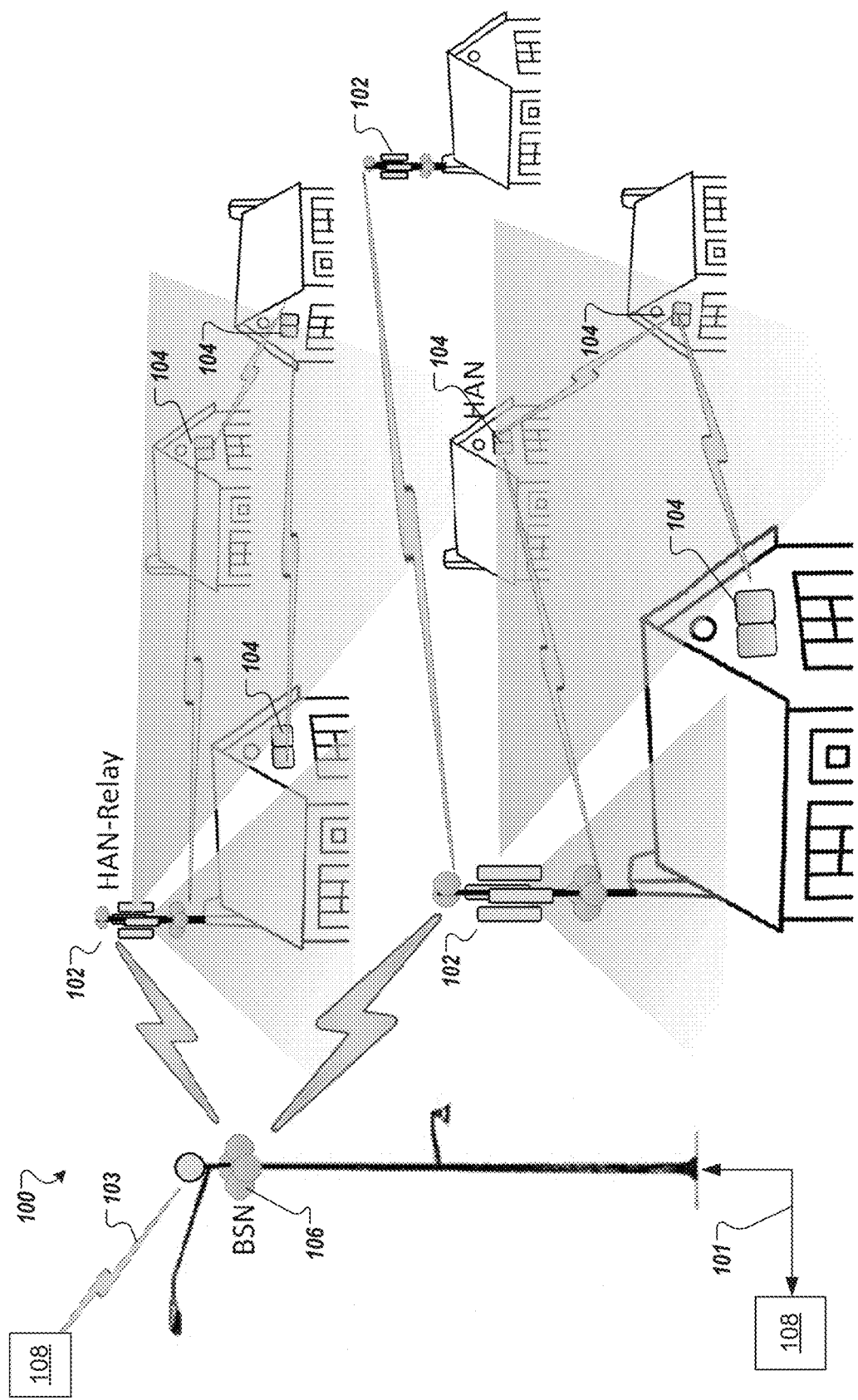
FIG. 1 is a network diagram of network hardware devices, organized in a wireless mesh network (WMN), for providing broadband connectivity to broadband Internet infrastructure according to one embodiment.

A wireless mesh network (WMN) containing multiple mesh network devices, organized in a multi-level mesh topology, is described. The mesh network devices in the WMN cooperate to provide broadband connectivity to broadband Internet infrastructure. The embodiments described herein may be implemented as suitable broadband Internet infrastructure in suburban geographic areas as described herein. The WMN may be deployed in a suburban environment to provide broadband connectivity to a home as an alternative to traditional wired internet service providers (ISPs). The WMN may use a combination of fixed wireless and mesh networking to deliver wireless broadband to a suburban home. Some outdoor fixed wireless links have been able to provide 50 Mbps over a distance of 18 kilometers. By overlaying a mesh network in a various mesh topologies (e.g., star topology, peer-to peer topology), the WMN may provide wireless broadband to a block of homes within proximity in a suburban environment. Such a network would allow customers to access to the Internet for web services, content streaming, or the like.

As described in various embodiments herein, the network hardware devices are organized in a WMN in which a HAN relay device that includes a first set of radios, each of the first set of radios being coupled to a beam-steering antenna and each of the first set of radios establishing a first point-to-point (PtP) wireless connection over which the HAN relay device communicates with a second HAN relay device in a first sub-mesh network of HAN relay devices. The HAN relay device also includes a second set of radios, each of the second set of radios being coupled to a beam-steering antenna and each of the second set of radios establishing a second PtP wireless connection over which the HAN relay device communicates with at least one of a plurality of HAN devices in a second sub-mesh network in the WMN.

Described herein are various types of network hardware devices, including base station node (BSN) devices, HAN relay devices, and HAN devices to provide broadband connectivity to broadband Internet structure. Multiple network hardware devices are connected wirelessly through a first sub-mesh network and other network hardware devices are connected wirelessly through a second sub-mesh network. Multiple network hardware devices are connected together over point-to-point (PtP) wireless connections using beam-steering antennas as described in more detail herein. The first sub-mesh network may be considered the backhaul and the second sub-mesh network can be considered the access. Other sector antennas may be used to wirelessly connect devices over point-to-multiple-points (PtMP) wireless connections. These antennas may be fixed-beam antennas as they are not beam-steering antennas used for PtP wireless connections.

As described herein, the network hardware devices can provide broadband connectivity to broadband Internet infrastructure to various consumer devices, such as laptop computers, desktop computers, televisions, tablet computers, home automation systems, personal digital assistants, or the like. In the case of client consumption devices, the WMN can provide broadband connectivity to content files, as well as other web-based services. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In some of the embodiments described herein, the mesh network architecture may include a limited number of point-of-presence (POP) nodes that have access to the Internet, and the hardware network devices of the two sub-mesh networks can distribute data between the POP nodes and the client devices. In some cases, the WMN can be deployed in a geographical area in which broadband Internet is limited. In other cases, the WMN can be deployed in suburban areas as an alternative to traditional wired infrastructures for broadband Internet. The WMN can scale to support a geographic area based on the number of mesh network devices, and the corresponding distances for successful communications over the wireless channels by those hardware network devices.

Although various embodiments herein are directed to content delivery, such as for the Amazon Instant Video (AIV) service, the WMNs, and corresponding mesh network devices, can be used as a platform suitable for delivering high bandwidth content in any application. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in suburban environments in particular. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIG. 1 is a network diagram of network hardware devices, organized in a WMN 100, for providing broadband connectivity to broadband Internet infrastructure according to one embodiment. The WMN 100 includes multiple network hardware devices that connect together to transfer digital data through the WMN 100 to be delivered to one or more client devices (not illustrated in FIG. 1) connected to the WMN 100. The WMN 100 includes two sub-mesh networks: a first sub-mesh network of HAN relay devices 102 and a second sub-mesh network of HAN devices 104. The WMN 100 also includes a BSN device 106 that wirelessly connects to the HAN relay devices 102. The BSN device 106 may operate as a point-of-presence device that has a wired connection 101 to broadband Internet infrastructure 108, a wireless connection 103 to broadband Internet infrastructure 108, or both. The wireless connection 103 may be a point-to-point (PtP) wireless connection to a CDN device (server of a CDN or a CDN node) of an Internet Service Provider (ISP). The CDN device may be a POP device (also referred to as a POP device), an edge server, a content server device or another device of the CDN. The BSN device 106 can act as a single ingress point to the WMN 100, whereas the POP device of the broadband Internet infrastructure may be one of many in a CDN. Alternatively, the WMN 100 may include more than one BSN device 106 as described herein, and the BSN device 106 may act as one of multiple ingress points to the WMN 100. In other embodiments, multiple BSN devices 106 may be deployed in the WMN 100, but the number of BSN devices 106 should be much smaller than a total number of network hardware devices (102, 104) in the WMN 100. In one embodiment, the BSN device 106 is a single gateway device to provide Internet connectivity to the HAN devices 104 and HAN relay devices 102 within the WMN 100. In another embodiment, the BSN device 106 is one of multiple gateway devices to provide Internet connectivity to the HAN devices 104 and HAN relay devices 102 within the WMN 100. The wireless connection 103 may be a directional microwave link between the BSN device 106 and another device of the broadband Internet infrastructure. Although a point-to-point wireless connection can be used, in other embodiments, other communication channels may be used. For example, a microwave communication channel may be used to exchange data. Other long distance communication channels may be used, such as a fiber-optic link as the wired connection 101, satellite link, cellular link, or the like. It should be noted that not all the hardware network devices (HAN relay devices 102, HAN devices 104) may not have direct access to the BSN device 106, but can use one or more intervening nodes to transfer data between the hardware network devices and the BSN device 106. The intervening nodes may also cache digital data that can be accessed by other nodes. The network hardware devices may also determine a shortest possible route between the requesting node and a node where the digital data is stored.

Figure 2:
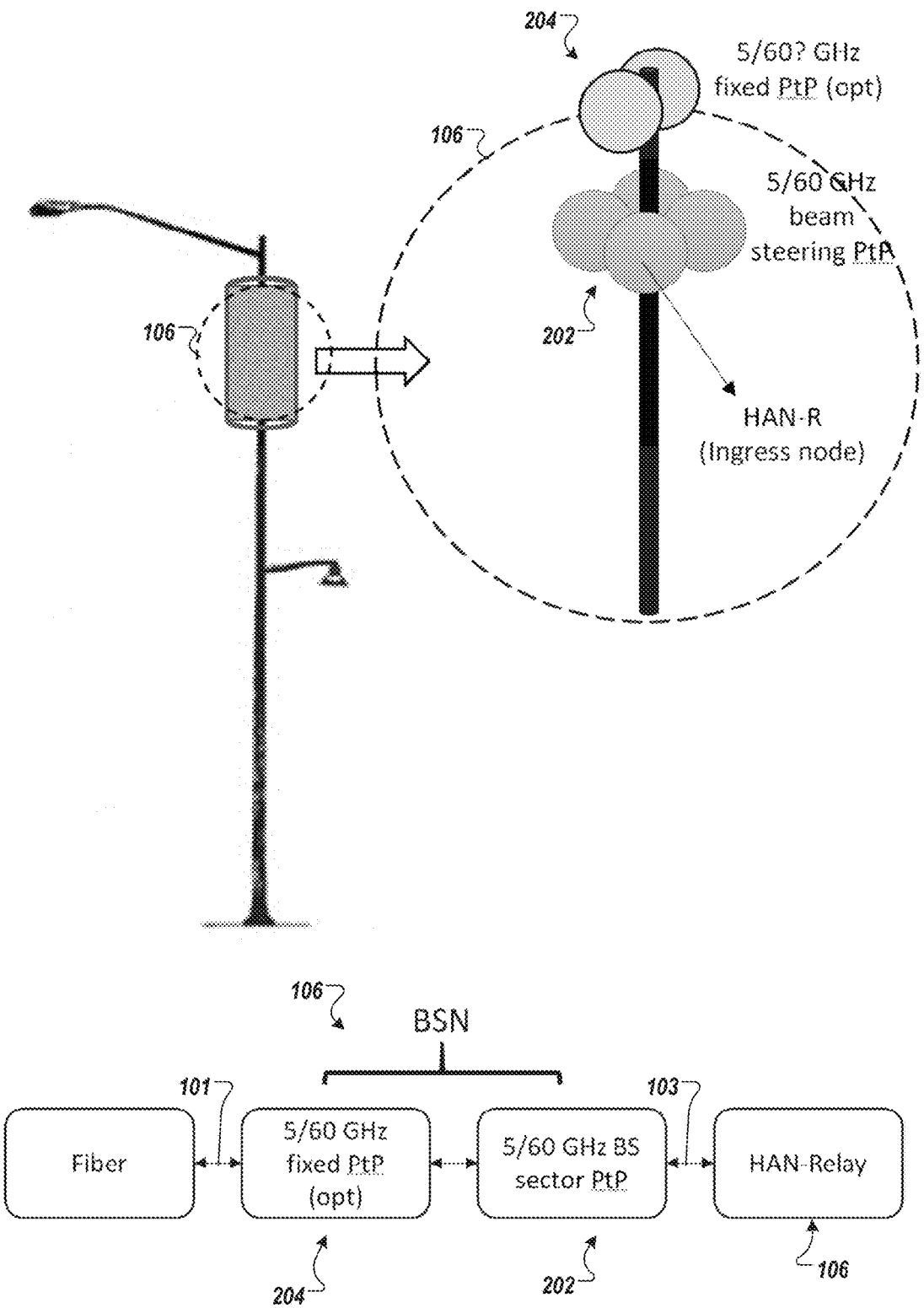
FIG. 2 illustrates a Base Station Node (BSN) device connected to a light pole in a geographic area according to one embodiment.
Figure 8:
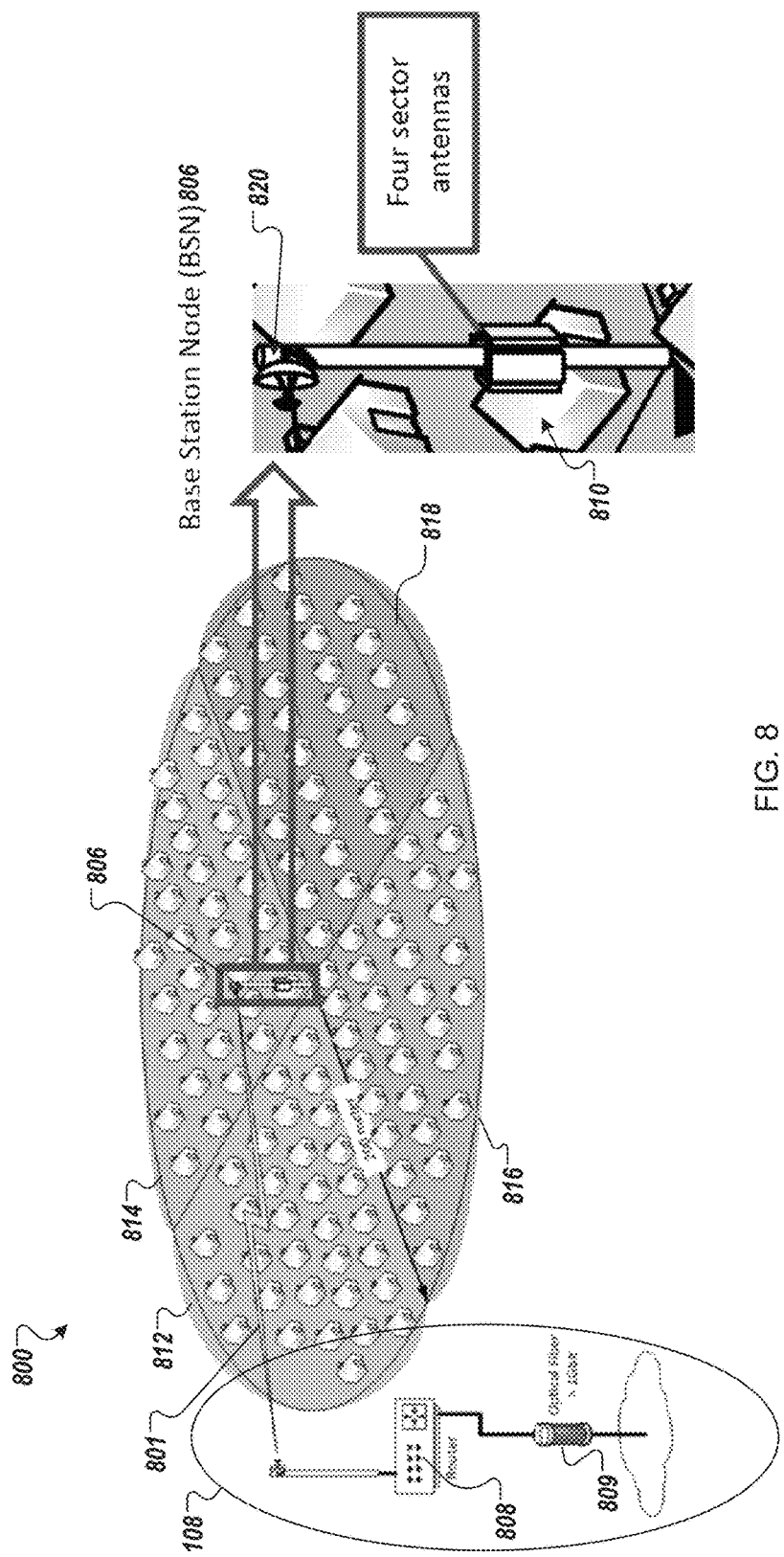
FIG. 8 illustrates a WMN in a PtMP star topology according to one embodiment.
Figure 10:
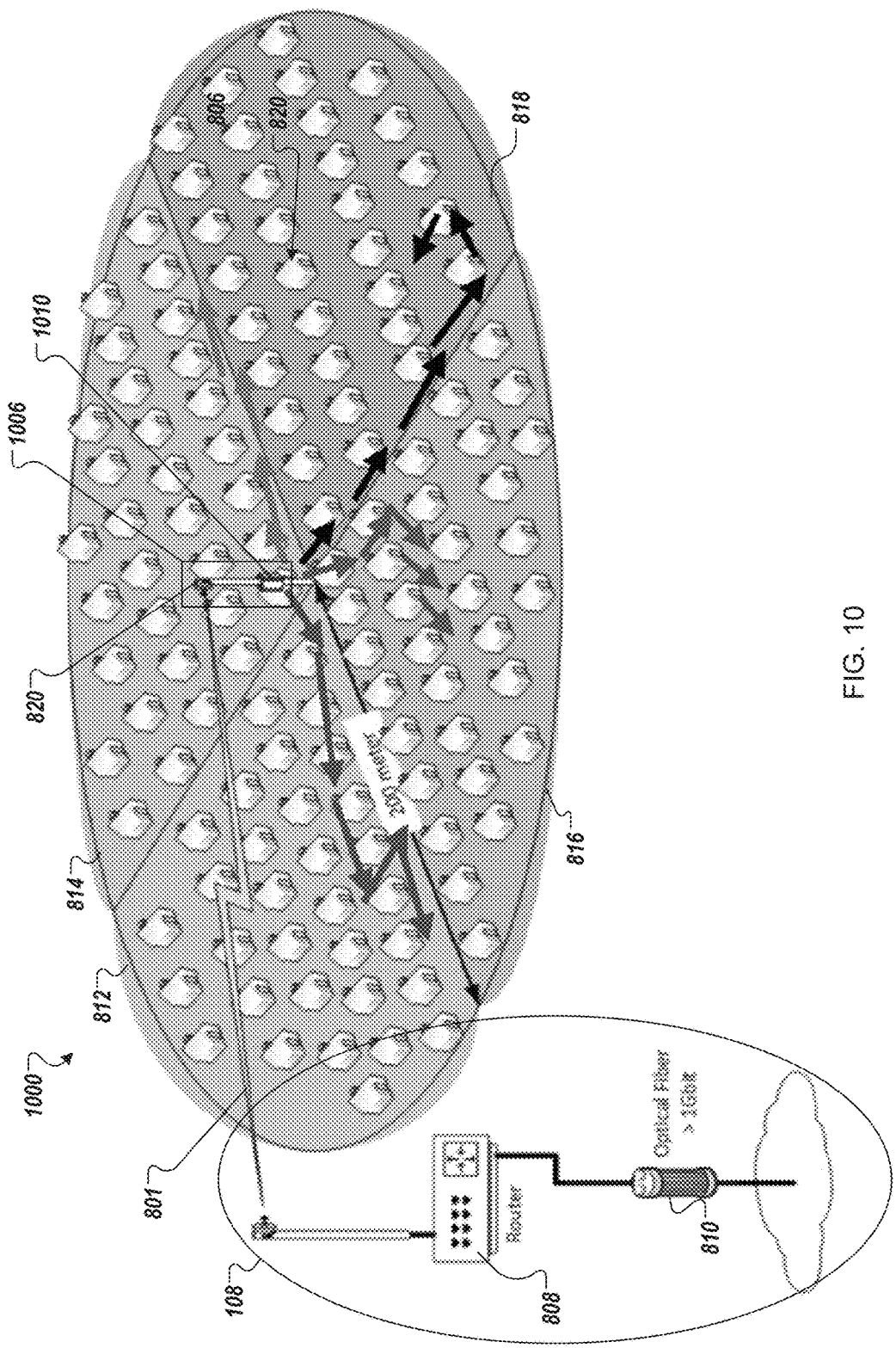
FIG. 10 illustrates a WMN in a PtP mesh network topology according to one embodiment.

FIG. 2 illustrates a BSN device 106 connected to a light pole in a geographic area according to one embodiment. A coverage area of the BSN device 106 can be split into four quadrants, called sectors, with four sector high-gain antennas 202. These four sector high-gain antennas 202 may be beam-steering antennas to establish PtP wireless connections with other hardware network devices in the WMN. In some embodiments, the four sector high-gain antennas 202 can be high-gain beam steering antennas 202. The BSN device 106, or at least the four sector high-gain antennas 202, can be connected to a tower or other structure. The four sector high-gain antennas 202 can be disposed on a light pole, a lamp post, a tower, or other structure that can put the BSN device 106 at a specified height to reduce the possibility of interfering structures. In some instances, the sector high-gain antennas 202 are referred to as sector antennas since they are disposed to cover sectors of the geographical area, as illustrated in FIGS. 8 and 10, for examples. In one embodiment, the four sector high-gain antennas 202 can be disposed 8 meters off the ground to provide line of sight (LoS) to other hardware network devices in the WMN. One of the four sector high-gain antennas 202 provides data connections to HAN relay devices 102 within its sector using a data stream communicated via the wired connection 101 (fiber or fixed backhaul radios) or the wireless connection 103 or both. Since the four sector high-gain antennas 202 are beam-steering antennas, each of the four sector high-gain antennas 202 can be used to connect to the HAN relay device 102 that can deliver an optimal data connectivity. It should be noted that various embodiments described herein include four sectors. Alternatively, in other embodiments, more or less sectors may be used.

As depicted in FIG. 2, the BSN device 106 uses one of the four sector high-gain antennas 202 to establish a PtP wireless connection 103 with the HAN relay device 102 (as an ingress node). The BSN device 106 can establish PtP wireless connections with other HAN relay devices 106 using the other sector high-gain antennas 202. In another embodiment, the BSN device 106 also includes one or more fixed-beam antennas 204 to establish PtP wireless connections with other network devices. For example, the BSN device 106 can establish a PtP wireless connection with a second BSN device 106 in the WMN 100. The BSN device 106 may not include a wired connection 101 and can communicate with the second BSN device 106 that does have a wired connection. The second BSN device 106 may be a backhaul node with fiber access. The BSN device 106 can communicate with other BSN devices 106 for other purposes. The fixed-beam antennas 204 may be optional for BSN devices that have direct wired connections to the broadband Internet infrastructure 108. The fixed-beam antennas 204 may permit the BSN device 106 to have large data throughput, such as approximately 1 to 7 Gbps). The fixed-beam antennas 204 can radiate electromagnetic energy at 5 GHz or 60 GHz, depending on the required data rate and the communication distance needed for proper wireless communication between devices. The fixed-beam antennas 204 can be coupled to radios in the BSN device 106 as described in more detail below with respect to FIG. 3. The radios may be bidirectional transceivers that transmit and receive wireless signals via the fixed-beam antennas 204.

Also, as depicted in FIG. 2, the BSN device 106 may include a transceiver to communicate with the broadband Internet infrastructure 108 via a wired connection 101. The wired connection 101 can be an optical fiber connection of greater than 1 Gbps throughput. The optical fiber connection can be through a router. The router may be part of the BSN device 106 or part of another device with which the BSN device 106 communicates.

Figure 3:
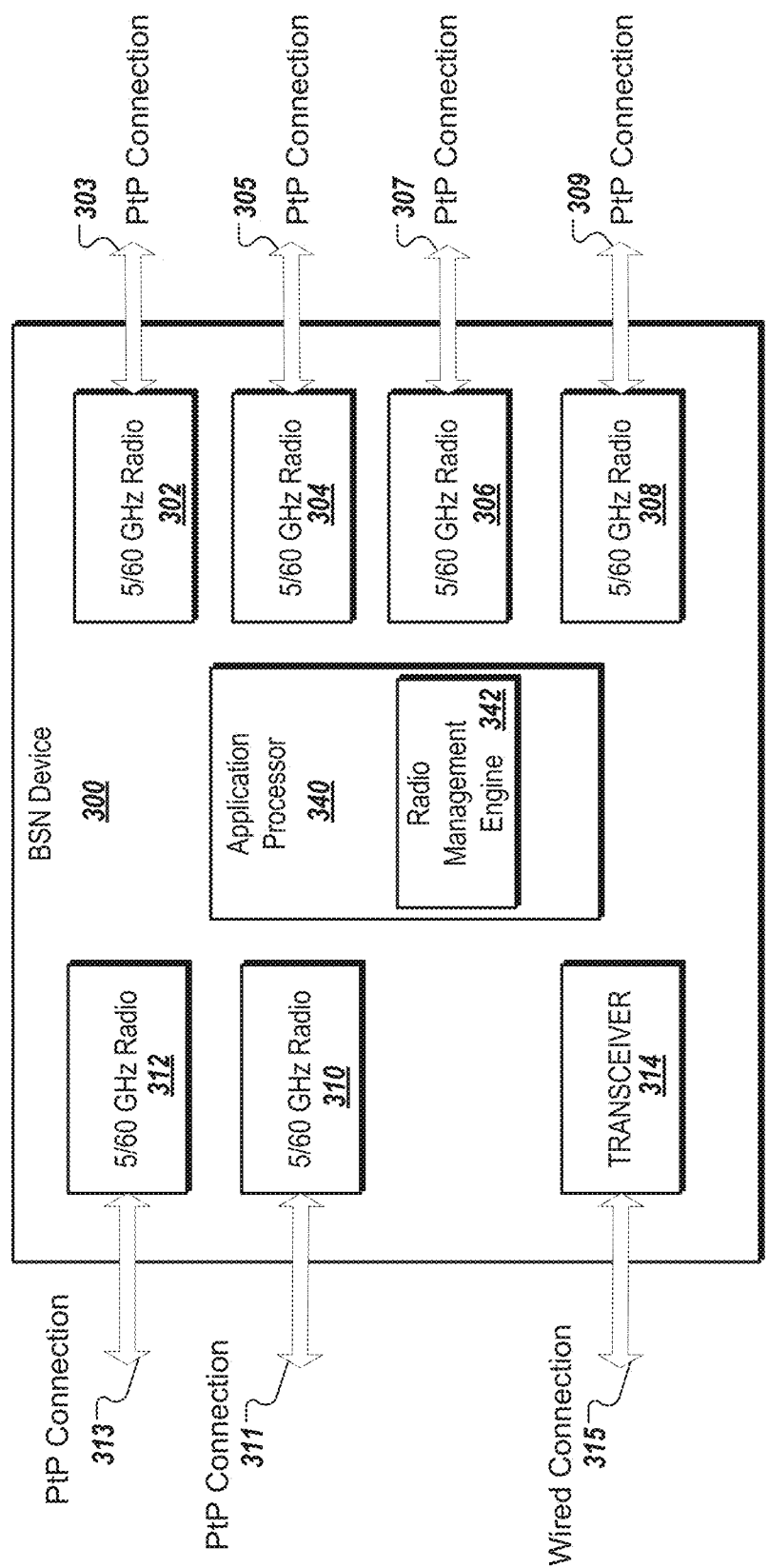
FIG. 3 is a block diagram of a BSN with multiple radios and an application processor according to one embodiment.

FIG. 3 is a block diagram of a BSN 300 with multiple radios and an application processor according to one embodiment. It should be noted that the BSN device 300 can be the BSN device 106 described above with respect to FIGS. 1-2. The BSN device 300 includes a first 5/60 GHz radio 302, a second 5/60 GHz radio 304, a third 5/60 GHz radio 306, a fourth 5/60 GHz radio 308, a fifth 5/60 GHz radio 310, a sixth 5/60 GHz radio 312, and a transceiver 314. The first 5/60 GHz radio 302 creates a first PtP wireless connection 303 between the BSN device 300 and a HAN relay device (not illustrated in FIG. 3) in a first sector of the WMN 100. The second 5/60 GHz radio 304 creates a second PtP wireless connection 305 between the BSN device 300 and a HAN relay device (not illustrated) in a second sector of the WMN 100. The third 5/60 GHz radio 306 creates a third PtP wireless connection 307 between the BSN device 300 and a HAN relay device (not illustrated) in a third sector of the WMN 100. The fourth 5/60 GHz radio 308 creates a fourth PtP wireless connection 309 between the BSN device 300 and a HAN relay device (not illustrated) in a fourth sector of the WMN 100. Each of the first, second, third, and fourth 5/60 GHz radios 302-308 is connected to a beam-steering antenna, such as one of the four high-gain sector antennas 202 of FIG. 2. Each of the first, second, third, and fourth 5/60 GHz radios 302-308 provides a data connection to a HAN relay device within its sector using a data stream received from the wired connection 101 or the wireless connection 103. The first, second, third, and fourth 5/60 GHz radios 302-308 can be used to provide backhaul for a first sub-mesh network of HAN relay devices 102, as described herein. It should also be noted that multiple HAN devices can be organized in a second sub-mesh network of HAN devices to provide access to devices within the respective structures to which the HAN devices reside.

The BSN device 300 also includes the fifth 5/60 GHz radio 310 creates a PtP wireless connection 311 between the BSN device 300 and a backhaul node with fiber access, such as another BSN device 106 in the WMN 100. The sixth 5/60 GHz radio 312 creates a PtP wireless connection 313 between the BSN device 300 and another backhaul node with fiber access, such as another BSN device 106. In another embodiment, there may be additional radios used for PtP wireless connections like PtP wireless connections 311, 313. Also, in other embodiments, more or less radios can be used for PtP wireless connections 303-309. Alternatively, different number of 5 GHz radios may be used for more or less PtP wireless connections with other mesh network devices.

The BSN device 300 also includes the transceiver 314 to create a wired connection 315 between the BSN device 300 and one or more devices in the broadband Internet infrastructure 108, such as a router coupled to an optical fiber connection. The transceiver 314 can be used for high speed data transmission with the broadband Internet infrastructure 108.

In other embodiments, the BSN device 300 may include other radios for other types of wireless communications, such as a cellular radio to communicate using one of the cellular technologies. For example, a network control service can be hosted in the cloud and the cellular connection can be used to communicate control information with the network control service to manage the WMN 100. In other embodiments, as long as there is Internet connectivity in the WMN 100, the control information can be communicated via the Internet connectivity, instead of the cellular connection. The cloud services of the WMN 100 (also referred to as software defined network (SDN)) can include mechanisms to deal with network devices that become unavailable, adding, removing, or modifying existing network devices in the WMN 100. The cloud services may also include mechanisms for remote health and management. For example, there may be a remote health interface, a management interface, or both to access the network devices for this purpose. The cloud services can also include mechanisms for securing the WMN 100 and the content that resides in the WMN 100. For example, the cloud services can control device access, DRM, and node authentication.

The BSN device 300 includes the application processor 340 to process data signals in connection with communicating with other network devices in a WMN. The application processor 340 is coupled to the radios 302-312 and the transceiver 314. In other embodiments, other processing devices may be used. The application processor 340 can execute various modules, such as a radio management engine 342. The radio management engine 342 can be a computer program that may operate as a background process, such as a daemon that is started at boot time and performs the tasks described above with respect to communications using the various radios described herein. The radio management engine 342 can configure hardware, run scheduled tasks, as well as perform the variety of tasks described above to communicate data packets or control packets as described herein. In one embodiment, the radio management engine 342 can communicate with the network control service hosted in the cloud using, for example, the transceiver 314 via the wired connection 315. The processing logic of radio management can be implemented locally in the radio management engine 342 at the application processor 340. Alternatively, some or all of the processing logic of the radio management engine 342 can be performed in a radio management engine hosted in the cloud as part of the network control service. Alternatively, the network control service can implement a radio management engine and the application processor 340 can implement the radio management engine 342 as a distributed system. Alternatively, the radio management engine 342 performs the various operations and reports the status, configuration, or other information to the network control service. In one embodiment, the radio management engine 342 performs the method 1600 described below with respect to FIG. 16A. Alternatively, the radio management engine 342 can perform other operations as described herein.

In one embodiment, the application processor 340 processes data signals in connection with communicating with other network devices in a WMN, such as the HAN relay device 102. The application processor 340 may be coupled to a first radio that is coupled to a first beam-steering antenna, a second radio that is coupled to a second beam-steering antenna. The application processor 340 communicates data with a second device over the wired connection 315 using the transceiver 314. The application processor 340 also communicates the data with a HAN relay device 102 using the first radio and the first beam-steering antenna over a PtP wireless connection. The application processor 340 can also communicate additional data to a second HAN relay device 102 over another PtP wireless connection using the second radio and the corresponding second beam-steering antenna.

In another embodiment, the BSN device 106 includes a first radio to communicate with a server of a content delivery network (CDN) over at least one of a first wired connection or a PtP wireless connection. The BSN device 106 also includes a set of four 60 GHz radios. Each of the set of four 60 GHz radios is coupled to a beam-steering antenna in one of four sectors of the BSN device 106. Each of the set of four 60 GHz radios establishes a PtP wireless connection over which the BSN device 106 wirelessly communicates with at least some of the HAN relay devices 102 in the geographic area.

In one embodiment, the BSN device 106 is one of multiple ingress nodes of the WMN 100 to provide Internet connectivity to devices within the WMN 100. In another embodiment, the BSN device 106 is the only ingress node of the WMN 100 to provide Internet connectivity to devices within the WMN 100.

Figure 4:
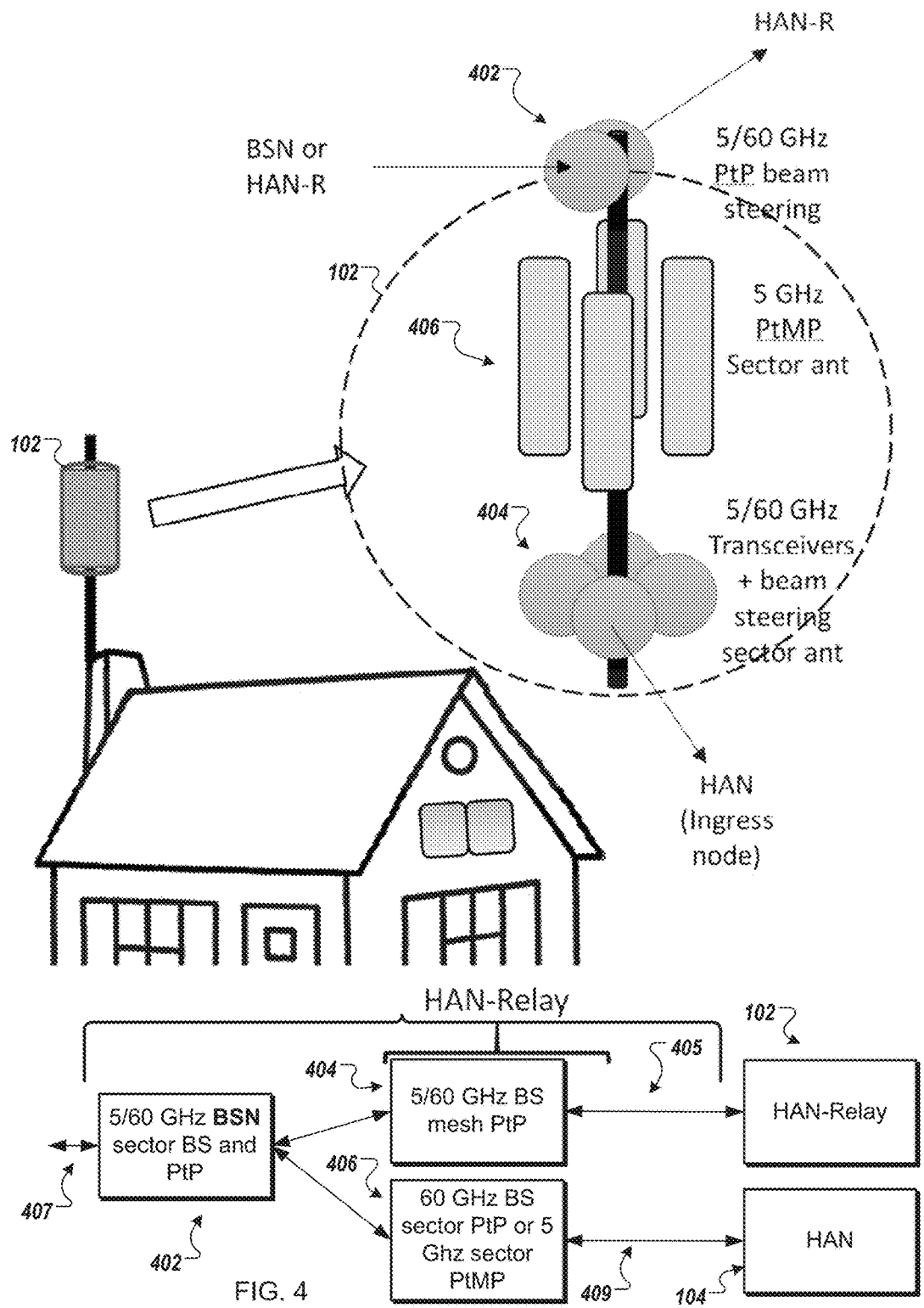
FIG. 4 illustrates a Home Access Node (HAN) relay device connected to a pole on a structure in the geographical area of the BSN according to one embodiment.

FIG. 4 illustrates a HAN relay device 102 connected to a pole on a structure in the geographical area of the BSN 106 according to one embodiment. As described above, the coverage area of the BSN device 106 can be split into four sectors using four sector high-gain antennas 202. Similarly, the HAN relay device 102 can include multiple sector high-gain antennas 402. These sector high-gain antennas 402 may be beam-steering antennas to establish PtP wireless connections with other hardware network devices in the WMN 100, such as the BSN device 106, another HAN relay device 102, or both. Alternatively, these sector high-gain antennas 402 may be sector fixed-beam antennas. In the depicted embodiment, there are two sector high-gain antennas 402, one of which can wirelessly connect to the BSN device 106 and the other of which can wirelessly connect to a second HAN relay device 102. Alternatively, one of the two sector high-gain antennas 402 can wirelessly connect to a second HAN relay device 102 and the other can wirelessly connect to a third HAN relay device 102. One of the two sector high-gain antennas 402 can connect with the BSN device 106 to form an ingress point of a first sub-mesh network of HAN relay devices 102 of the WMN 100. Another one of the two sector high-gain antennas 402 can connect with another HAN relay device 102 to relay data to another HAN relay device 102 that may not be connected to a BSN device 106.

The HAN relay device 102 also includes four beam-steering sector antennas 404 and four beam-steering sector antennas 406 (or optional four fixed-beam sector antennas). In some instances, the four beam-steering sector antennas 404 are referred to as sector antennas since they are disposed to cover sectors of a smaller geographical area surrounding the HAN relay device 102. In one embodiment, the four beam-steering sector antennas 404 can be disposed 4 meters above the structure to provide LoS to other HAN devices 104 in the WMN 100. The sector high-gain antennas 402 can provide connections to other HAN relay devices 102 or BSN devices 106. Each of the HAN devices is individually connected to a building in a geographic area and each of the HAN devices can be an access point to provide Internet connectivity to a client device (e.g., client consumption device) located in a respective building to which the first HAN device is connected. The HAN relay device 102, or at least the antennas 402, 404, 406 of the HAN relay device 102, can be connected to a structure or to a pole connected to the structure. One of the four beam-steering sector antennas 404 provides data connections to HAN devices 104 within its corresponding sector using a data stream communicated via the wireless connections to the BSN device 106 (or with another one of the HAN relay devices 102) as described herein. Since the four beam-steering sector antennas 406 are beam-steering antennas, each of the four beam-steering sector antennas 406 can be used to connect to the HAN devices 104 over PtP wireless connections 409 to deliver data with optimal data connectivity. In one embodiment, the four beam-steering antennas 404 can radiate electromagnetic energy at 5 GHz or at 60 GHz. The four beam-steering antennas 404 can be coupled to corresponding radios in the HAN relay device 102 as described in more detail below with respect to FIG. 5. The radios may be bidirectional transceivers that transmit and receive wireless signals via the corresponding one of the four beam-steering antennas 404.

In another embodiment, the HAN relay device 102 also includes four fixed-beam sector antennas 406 to establish PtMP wireless connections 409 with one or more HAN devices 104. One of the four fixed-beam sector antennas 406 provides data connections to HAN devices 104 within its corresponding sector using a data stream communicated via the wireless connections to the BSN device 106 (or with another one of the HAN relay devices 102). Since the four fixed-beam sector antennas 406 are not beam-steering antennas, the fixed beam sector antennas 406 can be used to establish a PtMP wireless connection with one or more HAN devices 104 in the corresponding sector. The four fixed-beam sector antennas 406 may be optional for HAN relay devices 102. The four fixed-beam sector antennas 406 may permit the HAN relay device 102 to have a backup wireless connection with large data throughput, such as approximately 1 to 7 Gbps. In one embodiment, the four fixed-beam sector antennas 406 can radiate electromagnetic energy at 5 GHz. The four fixed-beam sector antennas 406 can be coupled to corresponding radios in the HAN relay device 102 as described in more detail below with respect to FIG. 5. The radios may be bidirectional transceivers that transmit and receive wireless signals via the corresponding one of the four fixed-beam sector antennas 406.

As depicted in FIG. 4, the HAN relay device 102 uses one of the four beam-steering antennas 404 to establish a PtP wireless connection 405 with the HAN relay device 102 (as an ingress node). The HAN relay device 102 can establish PtP wireless connections 407 with other HAN relay devices 106 or the BSN device 106 using the sector high-gain antennas 402.

Figure 5:
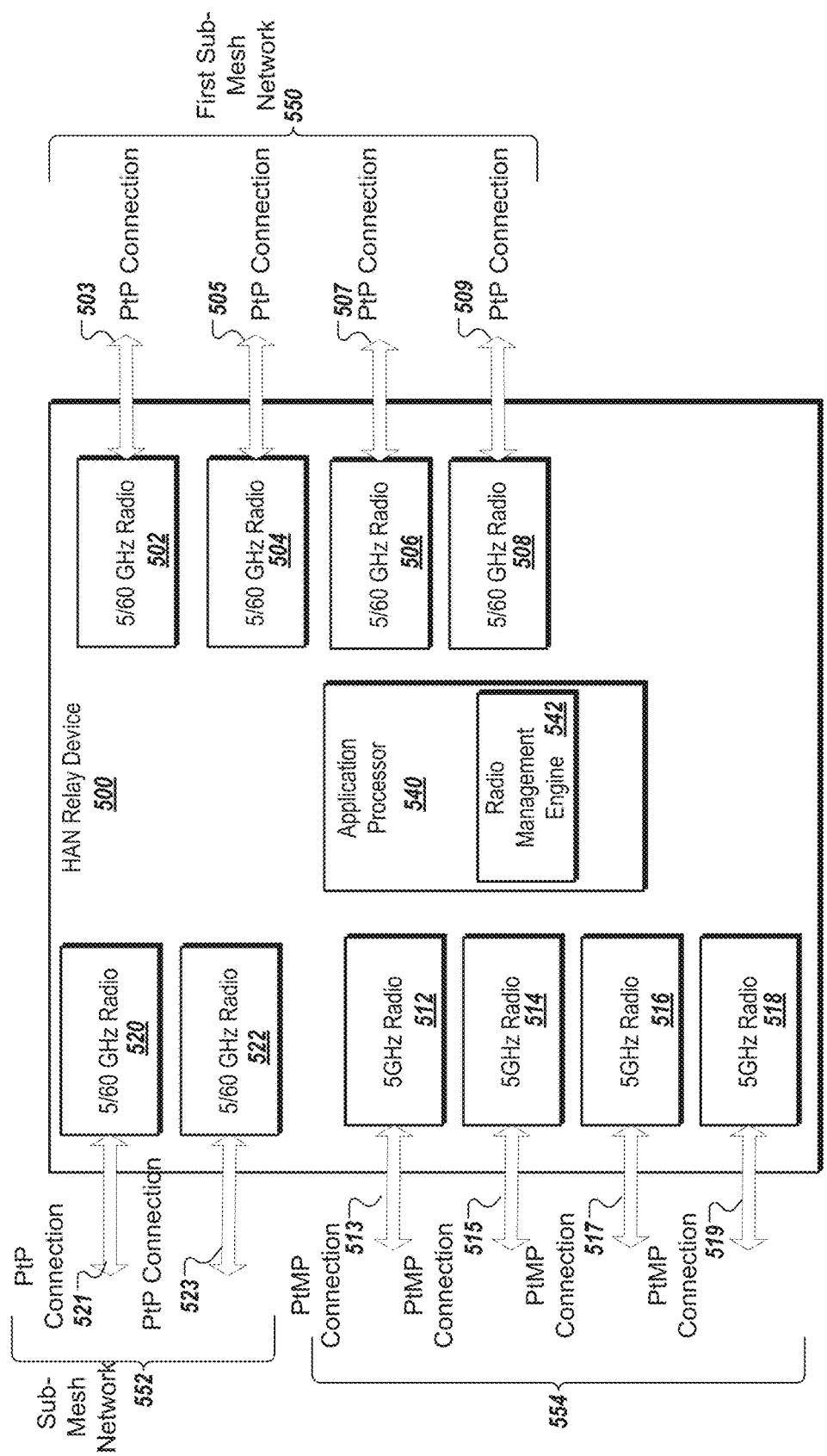
FIG. 5 is a block diagram of a HAN relay device with multiple radios and an application processor according to one embodiment.

FIG. 5 is a block diagram of the HAN relay device 500 with multiple radios and an application processor according to one embodiment. It should be noted that the HAN relay device 500 can be the HAN relay device 102 described above with respect to FIGS. 1-4. The HAN relay device 500 includes a first 5/60 GHz radio 502, a second 5/60 GHz radio 504, a third 5/60 GHz radio 506, a fourth 5/60 GHz radio 508, a fifth 5/60 GHz radio 510, and a sixth 5/60 GHz radio. The first 5/60 GHz radio 502 creates a first PtP wireless connection 503 between the HAN relay device 500 and a HAN device 104 (not illustrated in FIG. 5) in a first sector of the HAN relay device 500. The second 5/60 GHz radio 504 creates a second PtP wireless connection 505 between the HAN relay device 500 and a HAN device 104 (not illustrated) in a second sector of the HAN relay device 500. The third 5/60 GHz radio 506 creates a third PtP wireless connection 507 between the HAN relay device 500 and a HAN device 104 (not illustrated) in a third sector of the HAN relay device 500. The fourth 5/60 GHz radio 508 creates a fourth PtP wireless connection 509 between the HAN relay device 500 and a HAN device 104 (not illustrated) in a fourth sector of the HAN relay device 500. Each of the first, second, third, and fourth 5/60 GHz radios 502-508 is connected to a beam-steering antenna, such as one of the four beam-steering antennas 404 of FIG. 4. Each of the first, second, third, and fourth 5/60 GHz radios 502-508 provides a data connection to a HAN device 104 within its sector using a data stream received from the BSN device 106 (or from another HAN relay device 102). The first, second, third, and fourth 5/60 GHz radios 502-508 can be used to provide a sub-mesh network 550 of HAN devices 104 to provide access to devices within the respective structures to which the HAN devices 104 reside, as described herein. It should also be noted that multiple HAN relay devices 102 can be organized in a sub-mesh network 552 of HAN relay devices to provide backhaul to HAN devices 104 within the sub-mesh network 550.

The HAN relay device 500 also includes a ninth 5/60 GHz radio 520 and a tenth 5/60 GHz radio 522. The ninth 5/60 GHz radio 520 creates a PtP wireless connection 521 between the HAN relay device 500 and either a BSN device 106 or another HAN relay device 102 in the WMN 100. The tenth 5/60 GHz radio 5222 creates a PtP wireless connection 523 between the HAN relay device 500 and either a BSN device 106 or another HAN relay device 102 in the WMN 100. The ninth 5/60 GHz radio 520 and tenth 5/60 GHz radio 522 can be used to provide the sub-mesh network 552 of HAN devices 104 to provide backhaul to the HAN devices 104 within the sub-mesh network 550. In another embodiment, there may be additional radios used for PtP wireless connections to other HAN relay devices 102 or BSN devices 106, like PtP wireless connections 521, 523. Also, in other embodiments, more or less radios can be used for PtP wireless connections 503-509.

The HAN relay device 500 also includes a fifth 5 GHz radio 512, a sixth 5 GHz radio 514, a seventh 5 GHz radio 516, an eighth 5 GHz radio 518. The fifth 5 GHz radio 512 creates a first PtMP wireless connection 513 between the HAN relay device 500 and one or more of the HAN devices 104 (not illustrated in FIG. 5) in the first sector of the HAN relay device 500. The second 5 GHz radio 514 creates a second PtMP wireless connection 515 between the HAN relay device 500 and one or more of the HAN devices 104 (not illustrated in FIG. 5) in the second sector of the HAN relay device 500. The third 5 GHz radio 516 creates a third PtMP wireless connection 517 between the HAN relay device 500 and one or more of the HAN devices 104 (not illustrated in FIG. 5) in the third sector of the HAN relay device 500. The fourth 5 GHz radio 518 creates a fourth PtMP wireless connection 519 between the HAN relay device 500 and one or more of the HAN devices 104 (not illustrated in FIG. 5) in the fourth sector of the HAN relay device 500. Each of the first, second, third, and fourth 5 GHz radio 512-518 is connected to a fixed-beam antenna, such as one of the four fixed-beam antennas 406 of FIG. 4. Each of the first, second, third, and fourth 5 GHz radio 512-518 provides a data connection to a HAN device 104 within its sector using a data stream received from the BSN device 106 (or from another HAN relay device 102). The first, second, third, and fourth 5 GHz radios 512-518 can be used to provide backup wireless connections 554 to the wireless connections 503-509 of the sub-mesh network 550, as described herein.

In other embodiments, the HAN relay device 500 may include other radios for other types of wireless communications, such as a cellular radio to communicate using one of the cellular technologies. The cellular connection may be used to communicate with the network control service to manage the WMN 100 as described herein.

The HAN relay device 500 includes the application processor 540 to process data signals in connection with communicating with other network devices in a WMN. The application processor 540 is coupled to the radios 502-508, radios 512-518, and radios 520-522. In other embodiments, other processing devices may be used. The application processor 540 can execute various modules, such as a radio management engine 542 that is similar in operations of the radio management engine 342 described above with respect to FIG. 3.

In one embodiment, the application processor 540 processes data signals in connection with communicating with other network devices in a WMN, such as the HAN device 104. The application processor 540 may be coupled to a first radio (e.g., 520) that is coupled to a first beam-steering antenna, a second radio (e.g., 502) that is coupled to a second beam-steering antenna. The application processor 540 communicates data with the BSN device 106 (or another HAN relay device 102) over the PtP wireless connection 521 using the first radio 520 and communicate data with the HAN device 104 over the PtP wireless connection 503 using the second radio 502. The application processor 340 can also communicate additional data to a second HAN device 102 over another PtP wireless connection 505 using a third radio 504 and the corresponding beam-steering antenna.

In another embodiment, the HAN relay device 500 includes a first set of two 5/60 GHz radios. Each of the first set of two 5/60 GHz radios is coupled to a beam-steering antenna. Each of the first set of two 5/60 GHz radios establishes a PtP wireless connection over which the HAN relay device 500 communicates with a second HAN relay device in a first sub-mesh network of HAN relay devices in the WMN (referred to as HAN-R sub-mesh network). Alternatively, each of the first set of two 5/60 GHz radios establishes a PtP wireless connection with a BSN device. The HAN relay device 500 also includes a second set of four 5/60 GHz radios. Each of the second set of four 5/60 GHz radios is coupled to a beam-steering antenna in one of the four sectors. Each of the second set of four 5/60 GHz radios establishes a PtP wireless connection over which the HAN relay device 500 communicates with one of the HAN devices 104 in a second sub-mesh network in the WMN 100 (referred to as HAN sub-mesh network).

In a further embodiment, the HAN relay device 500 further includes a third set of four 5 GHz radios. Each of the third set of four 5 GHz radios is coupled to an antenna in one of the four sectors. Each of the third set of four 5 GHz radios establishes a PtMP wireless connection over which the HAN relay device 500 communicates with at least some of the HAN devices 104 in the second sub-mesh network of HAN devices in the WMN 100. The PtMP wireless connection may be a backup communication link for the PtP wireless connection.

In one embodiment, the radios 502-508 may be 60 GHz transceivers used to communicate with HAN devices 104 within corresponding sectors to initiate the second sub-mesh network of HAN devices. The radios 512-518 may be 5 GHz transceivers used to communicate with HAN devices within corresponding sectors to form PtMP sectors communication as back-up communication links for the second sub-mesh network (i.e., the 60 GHz mesh network).

In another embodiment, the BSN device 106 and BSN device 300 described above can also include the technology of the HAN relay device 102 and HAN relay device 500 described above to operate as a BSN/HAN relay device. In these embodiments, additional radios and antennas may be included in the same device. In another embodiment, the BSN device 106 can be located on a same structure as a HAN relay device 102. In such cases, the BSN device 106 (300) and the HAN relay device 102 (500) would include a transceiver to establish a wired connection between the two devices.

Figure 6:
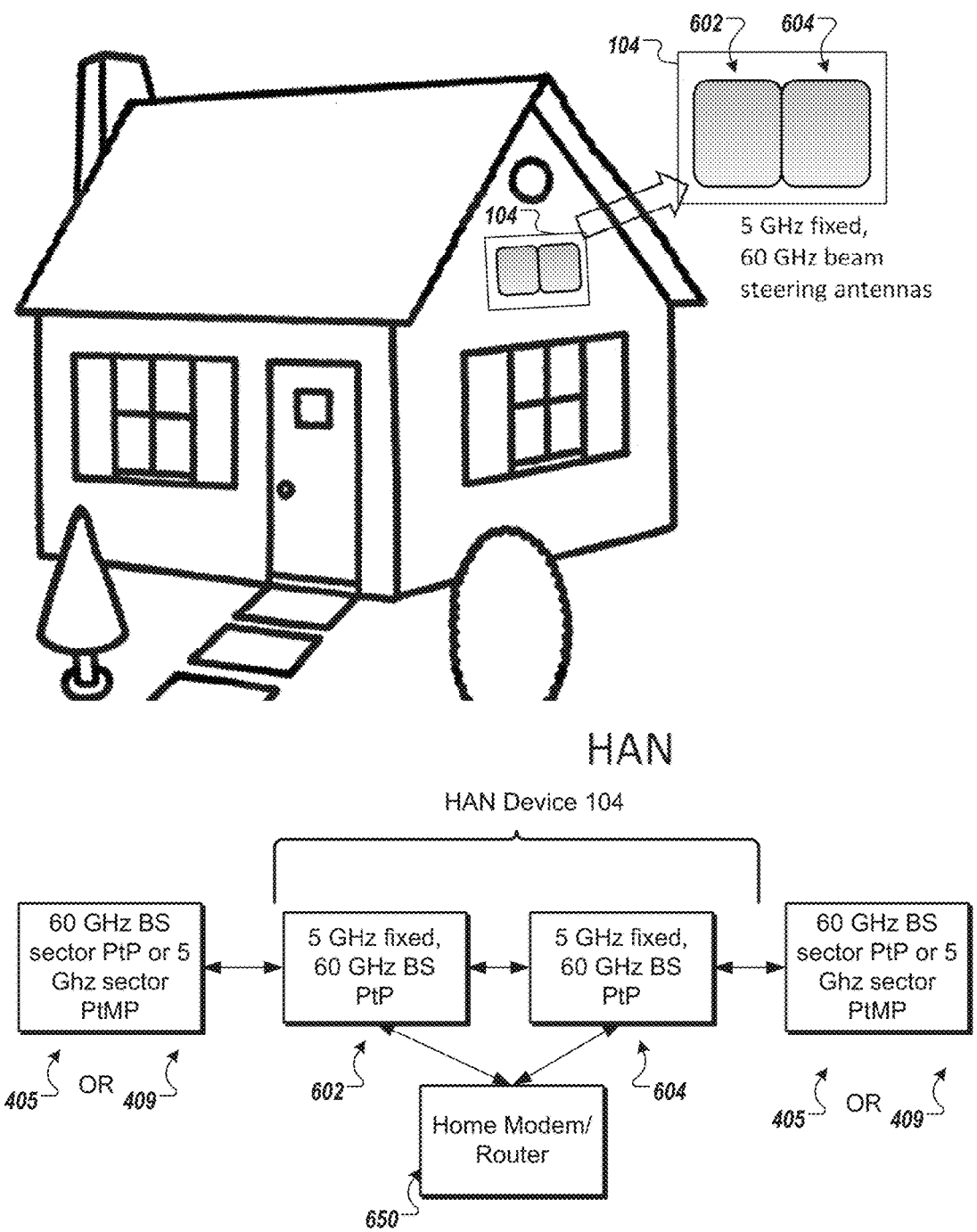
FIG. 6 illustrates a HAN device connected to an exterior of a structure in the geographical area of the BSN according to one embodiment.

FIG. 6 illustrates a HAN device 104 connected to an exterior of a structure in the geographical area of the BSN 106 according to one embodiment. As described above, the coverage area of the BSN device 106 can be split into four sectors using four sector high-gain antennas 202. Similarly, the HAN relay device 102 can be split into four sectors using four beam-steering antennas 404. In some instances, the four beam-steering sector antennas 404 are referred to as sector antennas since they are disposed to radiate electromagnetic energy to cover sectors of a smaller geographical area surrounding the HAN relay device 102. The HAN relay device 102 can also include the four fixed-beam antennas 406. The HAN device 104 includes two radios 602, 604, and each of the two radios is connected to both a 5 GHz fixed-beam antenna and a 60 GHz beam-steering antenna. In one embodiment, the 5 GHz fixed-beam antenna and the 60 GHz beam-steering antenna can be disposed on an exterior of a structure. The structure does not have to be the same structure upon which the HAN relay device 102 is disposed. The radio 602 can provide a data connection to one of the HAN relay devices 102 and the radio 604 can provide a data connection to another HAN device 104. Alternatively, the radio 604 can provide a data connection to one of the HAN relay devices 102 and the radio 602 can provide a data connection to another HAN device 104. These data connections can be via the beam-steering antennas or the fixed-beam antennas. The beam-steering antennas 604 can be used to connect to the HAN device 104 to the HAN relay device 102 to communicate data with optimal data connectivity. In one embodiment, the beam-steering antenna can radiate electromagnetic energy at 60 GHz. Alternatively, the beam-steering antenna can radiate electromagnetic energy at 5 GHz. The HAN device 104 can also have a wired connection or wireless connection to a device within the structure, such as a home modem/router 650. The radios 602, 604 may each be a bidirectional transceiver that transmit and receive wireless signals via the beam-steering antenna or the fixed-beam antenna.

The HAN device 104 can communicate with the HAN relay device 102 to form a mesh network using a beam-steering antenna and can provide Internet to a subscriber as an access point for the home modem/router 650.

Figure 7:
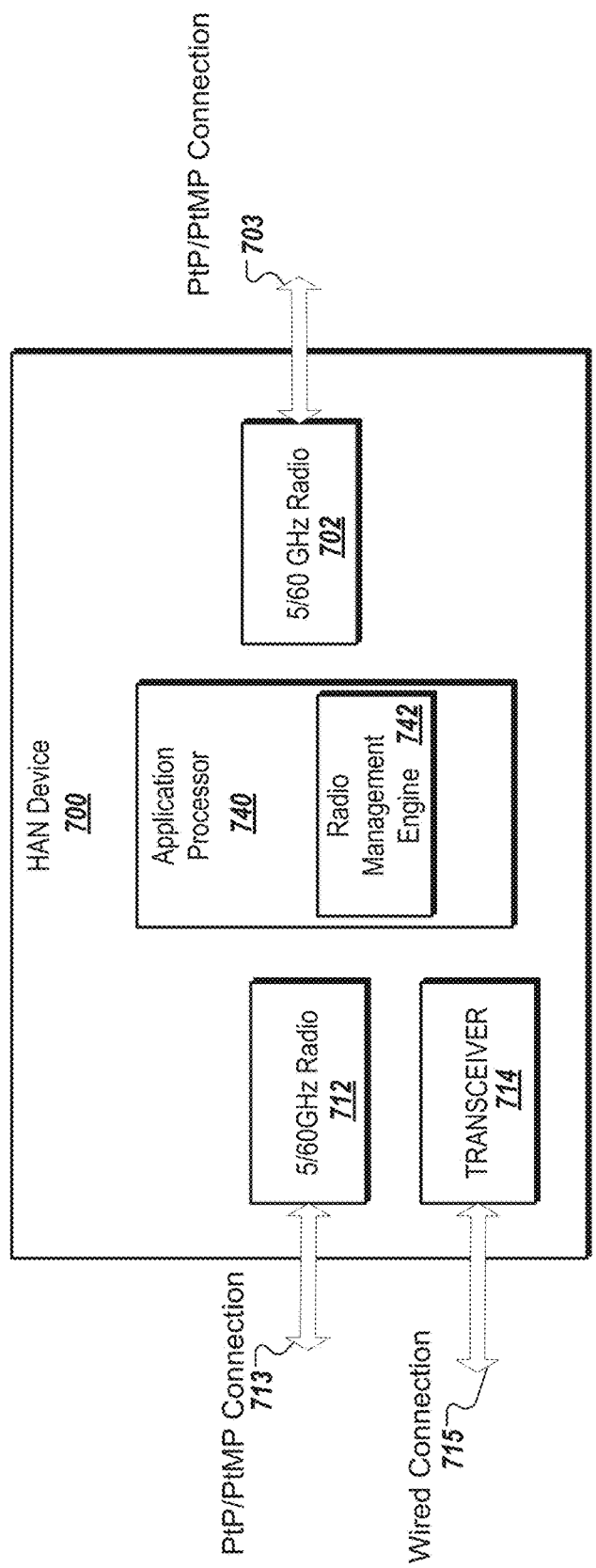
FIG. 7 is a block diagram of a HAN device with multiple radios and an application processor according to one embodiment.

FIG. 7 is a block diagram of a HAN device 700 with multiple radios and an application processor according to one embodiment. It should be noted that the HAN device 700 can be the HAN device 104 described above with respect to FIGS. 1-6. The HAN device 700 includes a 5/60 GHz radio 702 and a 5/60 GHz radio 712. The 5/60 GHz radio 702 creates a PtP or PtMP wireless connection 703 between the HAN device 700 and a HAN relay device 102 (not illustrated in FIG. 7). The 5/60 GHz radio 702 may be connected to a beam-steering antenna or a fixed-beam antenna as described herein. The 5/60 GHz radio 712 creates a PtP or PtMP wireless connection 713 between the HAN device 700 and a HAN device 104 (not illustrated in FIG. 7). Alternatively, the 5/60 GHz radio 712 creates a PtP or PtMP wireless connection 713 between the HAN device 700 and a HAN relay device 102 and the 5/60 GHz radio 702 creates a PtP or PtMP wireless connection 713 between the HAN device 700 and a HAN device 104 (not illustrated in FIG. 7). The HAN device 700 may be in any one of the four sectors of the HAN relay device. The 5/60 GHz radio 712 may be connected to a beam-steering antenna or a fixed-beam antenna. The HAN device 700 may be an access point to provide Internet connectivity to one or more client consumption devices located in or near a first building to which the HAN device 700 is connected. The HAN device 700 may include a transceiver 714 to create a wired connection 715 between the HAN device 700 and a device (home modem/router 650) located within the structure upon which the HAN device 700 is disposed. The wired connection 715 may be any type of wired connection. Alternatively, other connections can be made between the HAN device 700 and the home modem/router 650, such as an optical connection, a WLAN connection, a PAN connection, or the like. Alternatively, the HAN device 700 may include routing capability to distribute content to devices located within or near the structure upon which the HAN device 700 is disposed.

In another embodiment, there may be additional radios used for PtP wireless connections or PtP wireless connection. Also, in other embodiments, more or less radios can be used for PtP wireless connections and PtMP wireless connection. In other embodiments, the HAN device 700 may include other radios for other types of wireless communications, such as a cellular radio to communicate using one of the cellular technologies. The cellular connection may be used to communicate with the network control service to manage the WMN 100 as described herein.

The HAN device 700 includes the application processor 740 to process data signals in connection with communicating with other network devices in a WMN. The application processor 740 is coupled to the 60 GHz radio 702 and the 5 GHz radio 712. In other embodiments, other processing devices may be used. The application processor 540 can execute various modules, such as a radio management engine 742 that is similar in operations of the radio management engine 342 described above with respect to FIG. 3.

In one embodiment, the application processor 740 processes data signals in connection with communicating with other network devices in a WMN, such as the HAN relay device 102. The application processor 740 may be coupled to a first radio 702 (e.g., 5/60 GHz) that is coupled to a beam-steering antenna or a fixed-beam antenna and a second radio 712 (e.g., 5/60 GHz) that is coupled to a beam-steering antenna or a fixed-beam antenna. The application processor 740 communicates data with the HAN relay device 102 over the PtP or PtMP wireless connection 703 using the first radio 702 and communicates data with a HAN relay device 104 over the PtP PtMP wireless connection 713 using the second radio 712. In another embodiment, the application processor 740 communicates data with the HAN relay device 102 over the PtP or PtMP wireless connection 713 using the second radio 712 and communicates data with a HAN relay device 104 over the PtP PtMP wireless connection 703 using the first radio 702.

In one embodiment, the first radio 702 may be a 60 GHz transceiver used to communicate with HAN relay device 102 on the second sub-mesh network. The second radio 712 may be a 5 GHz transceiver used to communicate with HAN relay device 102 on the backup communication link for the second sub-mesh network (i.e., the 60 GHz mesh network).

FIG. 8 illustrates a WMN 800 in a PtMP star topology according to one embodiment. The WMN 800 includes a BSN device 806 that wirelessly connects to a router 808 of the broadband Internet infrastructure 108. The router 808 is coupled to an optical fiber connection 809 that provides access to the Internet for the WMN 800. In this embodiment, the BSN device 806 includes four sector antennas 810, each of the four sector antennas 810 corresponding to one of four sectors 812-818. The four sector antennas 810 may cover a geographic area represented by a circle having 200 meter radius. Each of the sectors 812-820 may be assigned a fixed-beam antenna to cover a quadrant and can establish a PtMP wireless connection with multiple HAN devices, each HAN device disposed at a structure within the sector. The four PtMP wireless connections by the four sector antennas 810 are also referred to as part of the backhaul in the WMN 800. The BSN device 806 also includes at least one antenna 820 that wirelessly connects to the router 808 of the broadband Internet infrastructure 108 via a PtP wireless connection 801. The PtP wireless connection 801 is made between beam-steering antennas (or fixed high-gain antennas), such as high-gain beam-steering antennas as described herein. The PtP wireless connection 801 is also referred to as part of the backhaul of the WMN 800. The four sector antennas 810 and the antenna 820 may use the 5 GHz unlicensed ISM band in a PtMP star configuration. This configuration of the WMN 800 may also be referred to as PtMP sector network.

Figure 9:
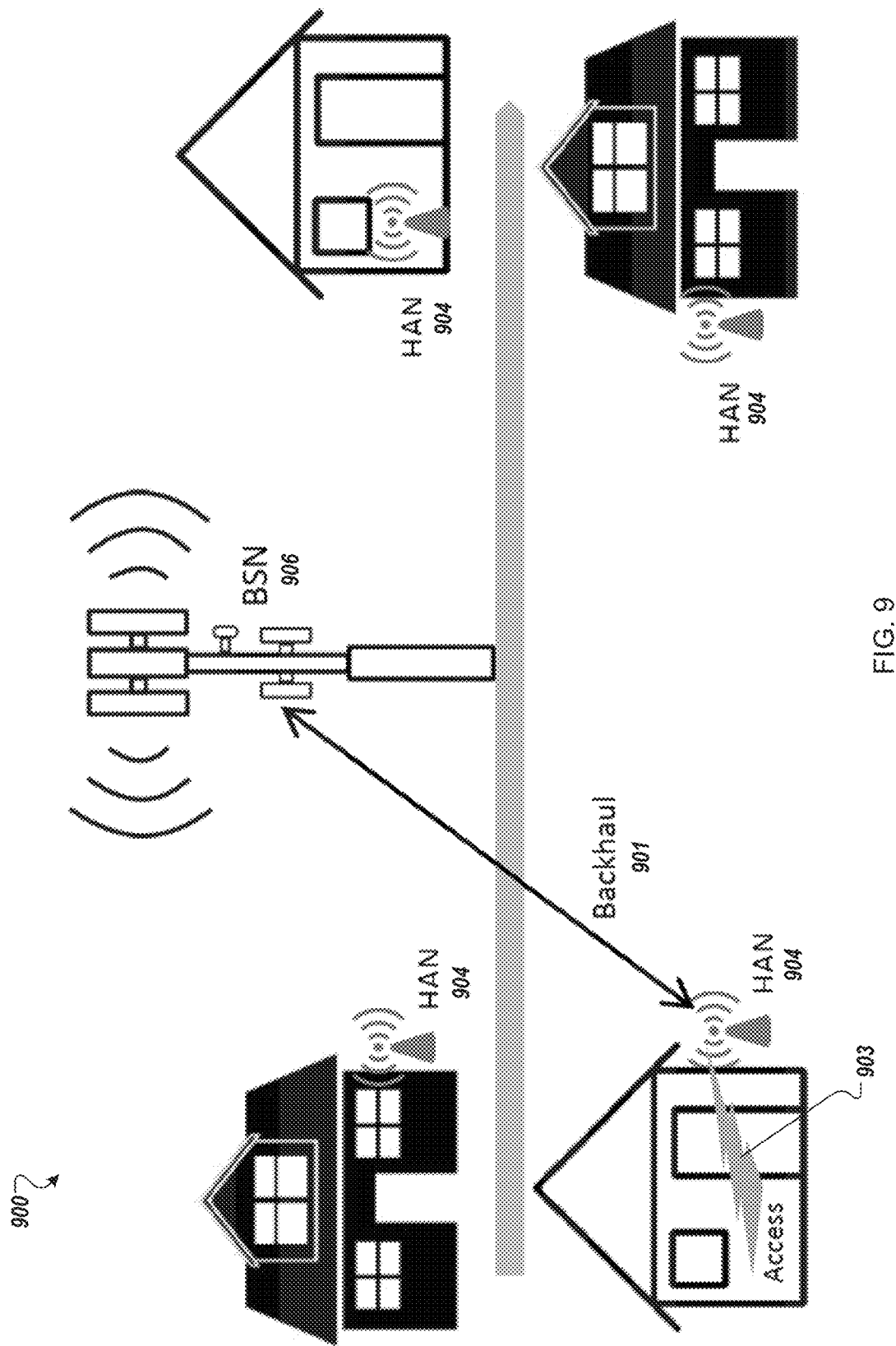
FIG. 9 illustrates a BSN device and HAN devices of a WMN in a PtMP star topology according to one embodiment.

For the PtMP star configuration, the BSN device 806 with an 8 meter high antenna can feed a HAN device. As shown in FIG. 8, the BSN device's coverage area is split into four quadrants and powered by the four high-gain sector antennas 810. The HAN device is a hardware device that may be similar to a cable modem or a satellite modem that connects to the BSN device 806 via an outdoor wireless link, referred to as BSN-to-HAN wireless link. The BSN-to-HAN wireless link may be a PtMP wireless link in that one sector antenna can communicate with multiple HAN devices. The HAN device provides broadband Internet access to a user's home. From a WMN customer perspective, the BSN-to-HAN wireless link is called "Backhaul," and the wireless link between the HAN device and the user home network is called "Access," such as illustrated in FIG. 9. The BSN device 806 may be professionally installed and mounted on a tower or light pole.

Figure 11:
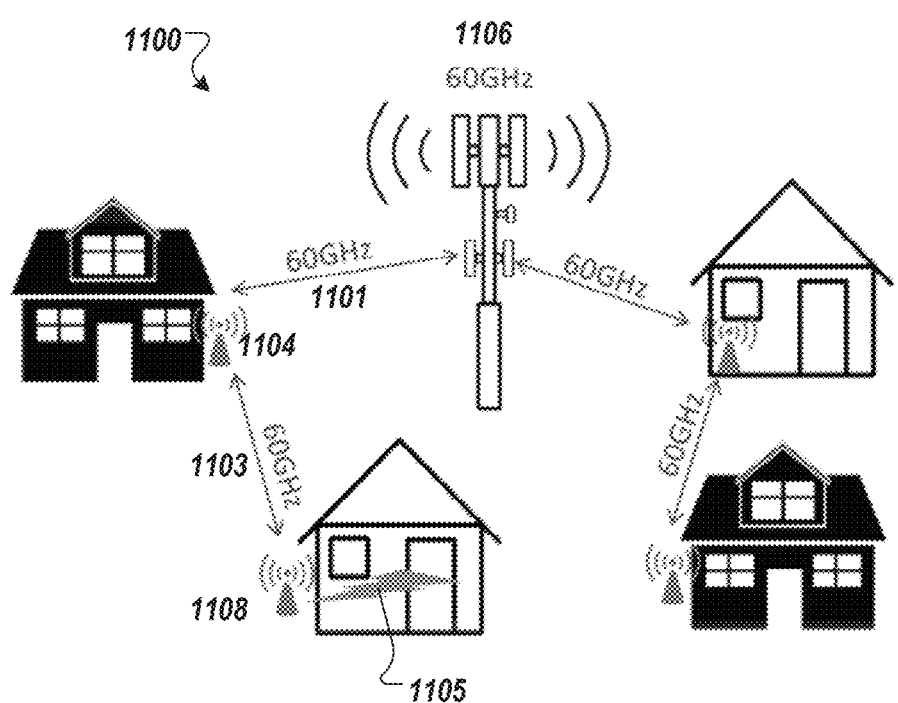
FIG. 11 illustrates a BSN device and HAN devices in a PtP mesh network topology according to one embodiment.
Figure 12:
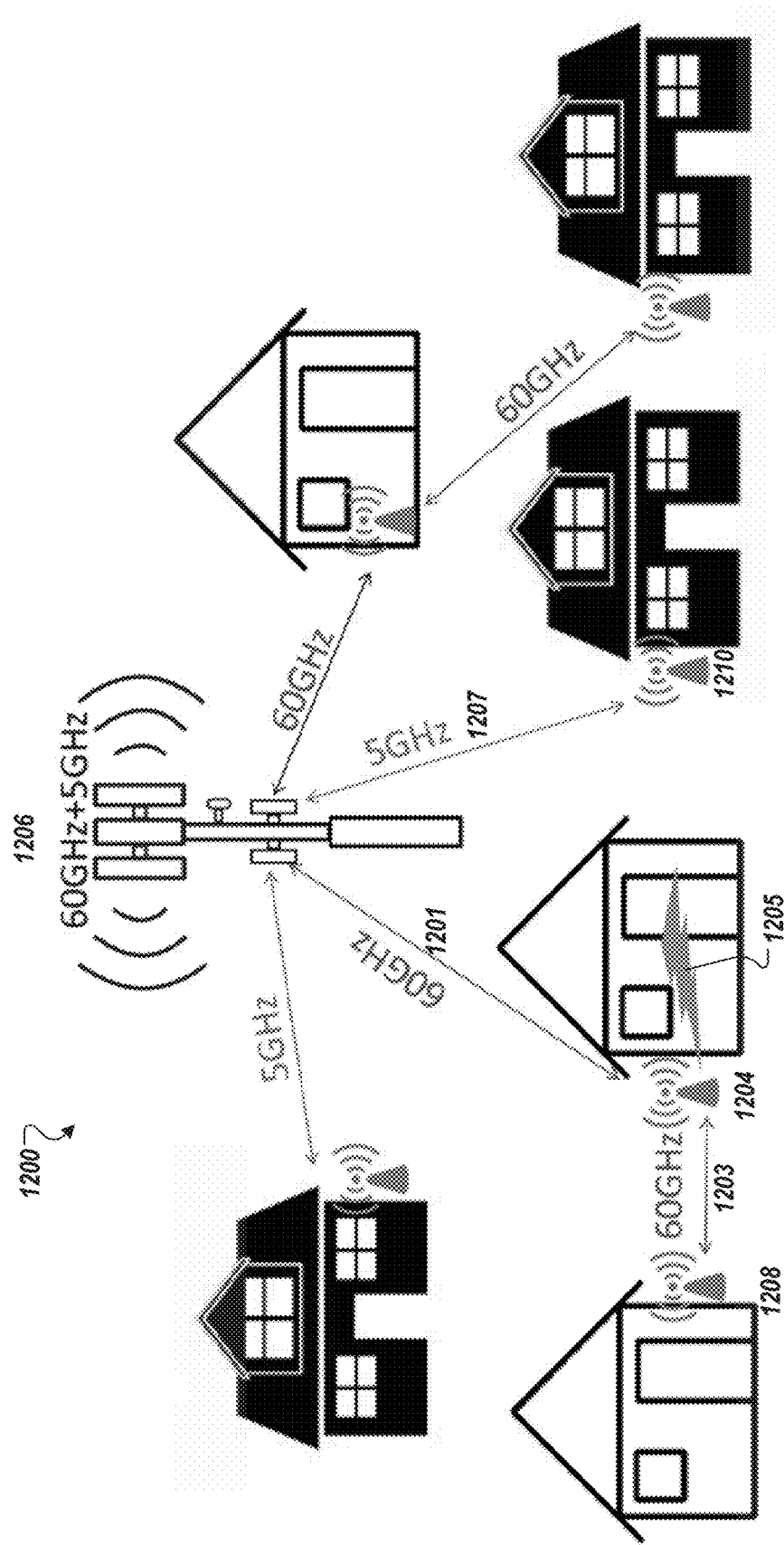
FIG. 12 illustrates a BSN device, HAN relay devices, and HAN devices in a hybrid network topology according to one embodiment.

Additional details of the PtMP star topology are set forth below with respect to FIG. 9. Alternatively, the WMN may be setup in a PtP mesh network topology, as illustrated in FIGS. 10-11, as well as a hybrid topology as illustrated in FIG. 12.

FIG. 9 illustrates a BSN device 906 and HAN devices 904 of a WMN 900 in a PtMP star topology according to one embodiment. This type of network topology uses 5 GHz for both backhaul and access. The BSN device 906 has four WLAN radios (e.g., radios using the Wi-Fi® 802.11ac technology). Each of the four WLAN radios supports 2×2 MIMO data streams and drives a high-gain sector antenna (e.g., 810). An antenna of the HAN device 904 points in the direction of a corresponding antenna at the BSN device 906. The antenna of the HAN device 904 may be self-installed, or installed by professional. The HAN device 904 may be installed at 2 meter height on an exterior of a structure, such as an outside wall of a building. As illustrated, the BSN device 906 communicates with one of the HAN devices 904 over a PtMP wireless connection 901, called "Backhaul." The HAN device 904 communicates with devices, which are located in or near the structure on which the HAN device 904 is installed, over a wireless or wired connection 903, called "Access."

The PtMP Star network supports both Line-of-Sight (LoS) and non-Line-of-Sight (NLoS) setups. To improve the backhaul wireless link quality and reliability, the antenna at the HAN device 904 can point in the general direction of the antenna of the BSN device 906 and be installed on an outside wall so that physical obstruction is limited to trees, wooden fences, exterior walls, or the like. A 5 GHz-only HAN device may be cheaper to manufacture, but the range and throughput of such a PtMP star network may be limited and may use a higher number of BSN device installations (e.g., 1 BSN for 10 homes), thus increasing overall network deployment costs.

FIG. 10 illustrates a WMN 1000 in a PtP mesh network topology according to one embodiment. The WMN 1000 is similar to the WMN 800 as noted by similar reference numbers, except the WMN 1000 includes a BSN device 1006 that operates in a PtP mesh network topology. Like the BSN device 806, the BSN device 1006 wireless connects to a router 808 of the broadband Internet infrastructure 108 using the antenna 820 as described above. Instead of four fixed-beam sector antennas, the BSN device 1006 includes four beam-steering sector antennas 1010 may cover the similar geographic area represented by the circle having 200 meter radius. Each of the sectors 812-820 may be assigned a beam-steering antenna to cover a quadrant and can establish a PtP wireless connection with a HAN device disposed at a structure within the corresponding sector. The four PtP wireless connections by the four beam-steering sector antennas 1010 are also referred to as part of the backhaul in the WMN 1000. The four beam-steering sector antennas 1010 may use the 60 GHz unlicensed millimeter wave band for "Backhaul," and HAN devices can use antennas with the 5 GHz ISM band for "Access" in a PtP configuration with a linear mesh. This configuration of the WMN 1000 may also be referred to as PtP linear mesh network.

For the PtP linear mesh configuration, the BSN device 1006 with an 8 meter high antenna can feed a HAN device. As shown in FIG. 10, the BSN device's coverage area is split into four quadrants and powered by the four beam-steering sector antennas 1010. The HAN device is a hardware device that may be similar to a cable modem or a satellite modem that connects to the BSN device 1006 via an outdoor wireless link, referred to as BSN-to-HAN wireless link. The BSN-to-HAN wireless link may be a PtP wireless link in that one sector antenna can communicate with one of the multiple HAN devices. The HAN device provides broadband Internet access to a user's home. From a WMN customer perspective, the BSN-to-HAN wireless link is called "Backhaul," and the wireless link between the HAN device and the user home network is called "Access," such as illustrated in FIG. 11. The BSN device 1006 may be professionally installed and mounted on a tower or light pole.

Additional details of the PtP linear mesh topology are set forth below with respect to FIG. 11. Alternatively, the WMN may be setup in a hybrid topology as illustrated in FIG. 12.

FIG. 11 illustrates a BSN device and HAN devices in a PtP mesh network topology according to one embodiment. This type of network topology uses 60 GHz for backhaul and 5 GHz for access. The BSN device 1106 includes four WLAN radios that support 2×2 MIMO data streams and each of the four WLAN radios drives a high-gain beam-steering sector antenna (e.g., 1010). For this type of a network, the BSN-HAN backhaul link should be LoS. The BSN device 1106 communicates with a first HAN device 1104 of a first structure (first home), and then the first HAN device 1104 can communicate with a second HAN device 1108 as a next hop, forming a PtP mesh network. The BSN device 1106 communicates with the first HAN device 1104 over a first PtP wireless connection 1101 and the first HAN device 1104 communicates with the second HAN device 1108 over a second PtP wireless connection 1103. The first PtP wireless connection 1101 and second PtP wireless connection 1103 are the "Backhaul" of the mesh network. The second HAN device 1108 communicates with devices inside or near the second HAN device 1108 over a wired or wireless connection 1105, called "Access." The first structure has a LoS between the BSN device 1106 and the first HAN device 1104 with the antenna of the HAN device 1104 pointing at the antenna of the BSN device 1106. The second structure does not need LoS to the BSN device 1106, but should have LoS to the first structure. For example, the second structure may not be in the same row or same side of the street as the first structure, but may have LoS to the first structure, such as across the street. A linear mesh is thus formed in a zigzag fashion. In one embodiment, an installation of the HAN device may include installing the box inside the house and installing an antenna at a 2 m height on an outside wall of the structure.

A 60 GHz-only HAN device may be more expensive, but the throughput of such a PtP Mesh network is much higher. In addition, the mesh network may use a lower number of BSN device installations (e.g., 1 BSN device for 100 HAN devices), thus, reducing overall network deployment cost. It should be noted that the number of hops needed to cover structures (e.g., homes) that do not have LoS to the BSN device 1106 (or a neighbor HAN) might limit the scale of the deployment. Also, a high number of next hops may affect the latency and have an impact of quality of service (QoS) of the mesh network. Alternatively, the WMN may be setup in a hybrid topology as illustrated in FIG. 12.

FIG. 12 illustrates a BSN device, HAN relay devices, and HAN devices in a hybrid network topology according to one embodiment. This type of network topology uses 60 GHz and 5 GHz for backhaul using the BSN device 1206. Depending on the type of neighborhood, the BSN device 1206 can use either combination of 5 GHz or 60 GHz wireless links to provide reliable broadband Internet coverage to a home. The BSN device 1206 includes both 5 GHz and 60 GHz radios. In other embodiments, a spectrum in any of the cellular bands can be used if licensed. The radio can be added to support this spectrum.

In one embodiment, the BSN device 1206 includes four WLAN radios that each supports 2×2 MIMO data streams and drives a high-gain beam-steering sector antenna (e.g., 1010). For this type of a network, the BSN-HAN backhaul link should be LoS. The BSN device 1206 communicates with a first HAN device 1204 of a first structure (first home) over a first PtP wireless connection 1201, and then the first HAN device 1204 can communicate with a second HAN device 1208 as a next hop over a second PtP wireless connection 1203, forming a PtP mesh network. The first PtP wireless connection 1201 and second PtP wireless connection 1203 are the "Backhaul" of the mesh network. The second HAN device 1208 communicates with devices inside or near the second HAN device 1208 over a wired or wireless connection 1205, called "Access." Similarly, the first HAN device 1204 communicates with devices in side or near the first HAN device 104 over a wired or wireless connection, called "Access." The first structure has a LoS between the BSN device 1206 and the first HAN device 1204 with the antenna of the HAN device 1204 pointing at the antenna of the BSN device 1206. The second structure does not need LoS to the BSN device 1206, but should have LoS to the first structure. The BSN device 1206 can also communicate with a third HAN device 1210 over a PtMP wireless connection 1207. The BSN device 1206 can communicate with the third HAN device 1210 using the 5 GHz ISM band, instead of the 60 GHz using for the PtP wireless connection 1201.

A hybrid network may address the LoS-only restriction of 60 GHz links by using an NLoS 5 GHz link to the next hop in the mesh network. Such a hybrid deployment also may overcome a range limitation of a 5 GHz-only network, and reduces the number of hops in a 60 GHz-only network.

In the following description, network setup and scaling and cost to deploy an example WMN is described. Various cities across the U.S. have programs to bring broadband connectivity to its residents and have started installing fiber under major streets. The fiber network does not directly connect to homes, but is available to ISPs that want to take advantage of the infrastructure to build neighborhood wireless networks. Cities also allow wireless service providers to install WLAN equipment on street light poles (for power) and tap into the fiber network infrastructure. This is typically done via a permit and approval process by the city council. For example, in the Bay Area, cities that provide such a public infrastructure to set up a wireless service include Santa Clara, Palo Alto and San Jose. For cities that do not provide such a public infrastructure service, the BSN devices can be installed on a tower. The connection from the BSN device back to web services can be via a local fiber loop or a second PtP wireless link.

For one example network, a neighborhood in the city of Santa Clara, Calif., can be modeled as a 1600-home neighborhood in a 40×40 grid (Manhattan layout). The distance between homes is 30-40 meters for an overall coverage area of 1.5-2.5 sq·km. For such a build-out, a WMN can be deployed. The BSN device in the WMN is the central ingress/egress point for the entire network. The BSN device has sufficient computing and storage capacity and operates as a master switch, managing the network and the traffic flow, with the fiber backhaul to the network control service as described herein. The network control service may be similar to a packet gateway in a cellular network. As the BSN device is an expensive piece of equipment, the number of BSN device installations should be considered. So, as part of network planning, a tiered hierarchy can be used to manage connectivity services for the entire neighborhood. In a lower tier than the BSN, a lower-cost variant of the BSN device can be used that has multiple radios, both 5 GHz and 60 GHz radios, but without the fiber backhaul to the hosted network control service. This hardware network device is referred to herein as HAN relay device and may have lower computing and storage capacity than the BSN device. The HAN relay device permits the WMN to be scaled. The network topology is illustrated and described with respect to FIG. 13.

Figure 13:
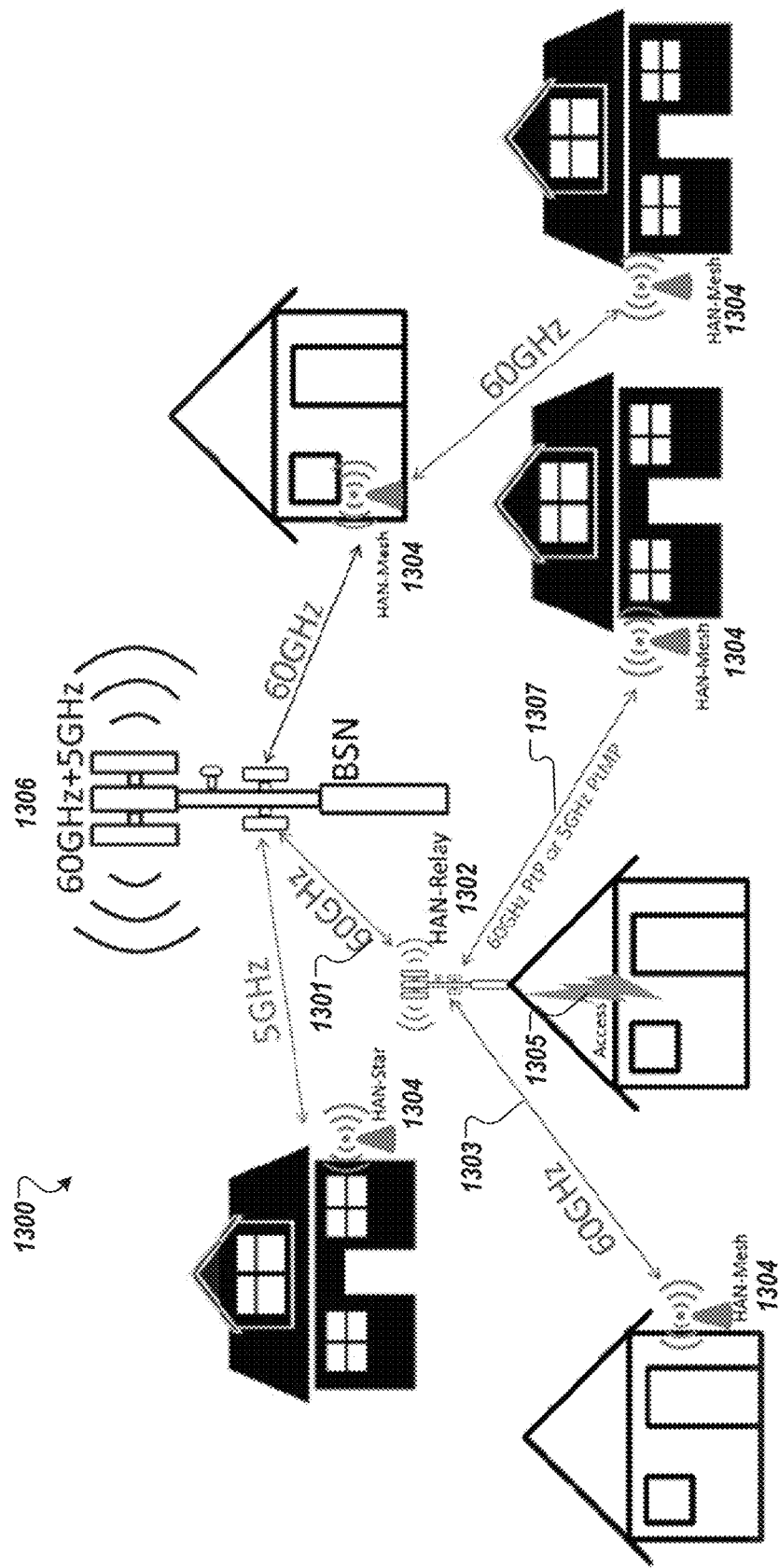
FIG. 13 illustrates a WMN deployment according to another embodiment.

FIG. 13 illustrates a WMN 1300 deployment according to another embodiment. The WMN 1300 uses a hybrid network topology as described herein. The WMN 1300 includes a HAN relay device 1302, multiple HAN devices 1304, and a BSN device 1306. This type of network topology uses 60 GHz and 5 GHz for backhaul using the BSN device 1206. Depending on the type of neighborhood, the BSN device 1206 can use either combination of 5 GHz or 60 GHz wireless links to provide reliable broadband Internet coverage to a home. The BSN device 1206 includes both 5 GHz and 60 GHz radios. The BSN device 1306 includes four WLAN radios that each supports 2×2 MIMO data streams and drives a high-gain beam-steering sector antenna (e.g., 1010). The BSN device 1206 communicates with a HAN relay device 1302 of a first structure (first home) over a first PtP wireless connection 1301 (e.g., 60 GHz). The HAN relay device 1302 has four WLAN radios (e.g., WLAN radios using the Wi-Fi® 802.11ad technology), which each drive one of four high-gain beam-steering sector antennas. The HAN relay device 1302 also includes four WLAN radios (e.g., WLAN radios using the Wi-Fi® 802.11ac technology), which each drives one of four high-gain antennas. These antennas can be considered fixed-beam antennas. The HAN relay device 1302 can also be professionally installed on an 8 m height. An ideal location may be a city building, a light pole in the neighborhood, even on a rooftop of a structure, if permitted. In this network topology, the HAN relay device 1302 takes on two forms: a HAN-Star and a Han-Mesh. The HAN-Star supports a PtMP Star (5 GHz only) configuration, and the Han-Mesh supports a hybrid (PtMP Star and PtP Mesh) configuration. The HAN devices 1304 can be self-installed with the antenna at a 2 m height on an outside wall.

The HAN relay device 1302 can communicate with a second HAN device 1304 as a next hop over a second PtP wireless connection 1303, forming a PtP mesh network. The HAN relay device 1302 can also communicate with devices inside or near the second HAN device 1208 over a wired or wireless connection 1305, called "Access." The HAN relay device 1302 can communicate with a third HAN device 1304 as a next hop over a wireless connection 1307. The wireless connection 1307 can be either a third PtP wireless connection (e.g., 60 GHz) or a PtMP wireless connection (e.g., 5 GHz).

Figure 14:
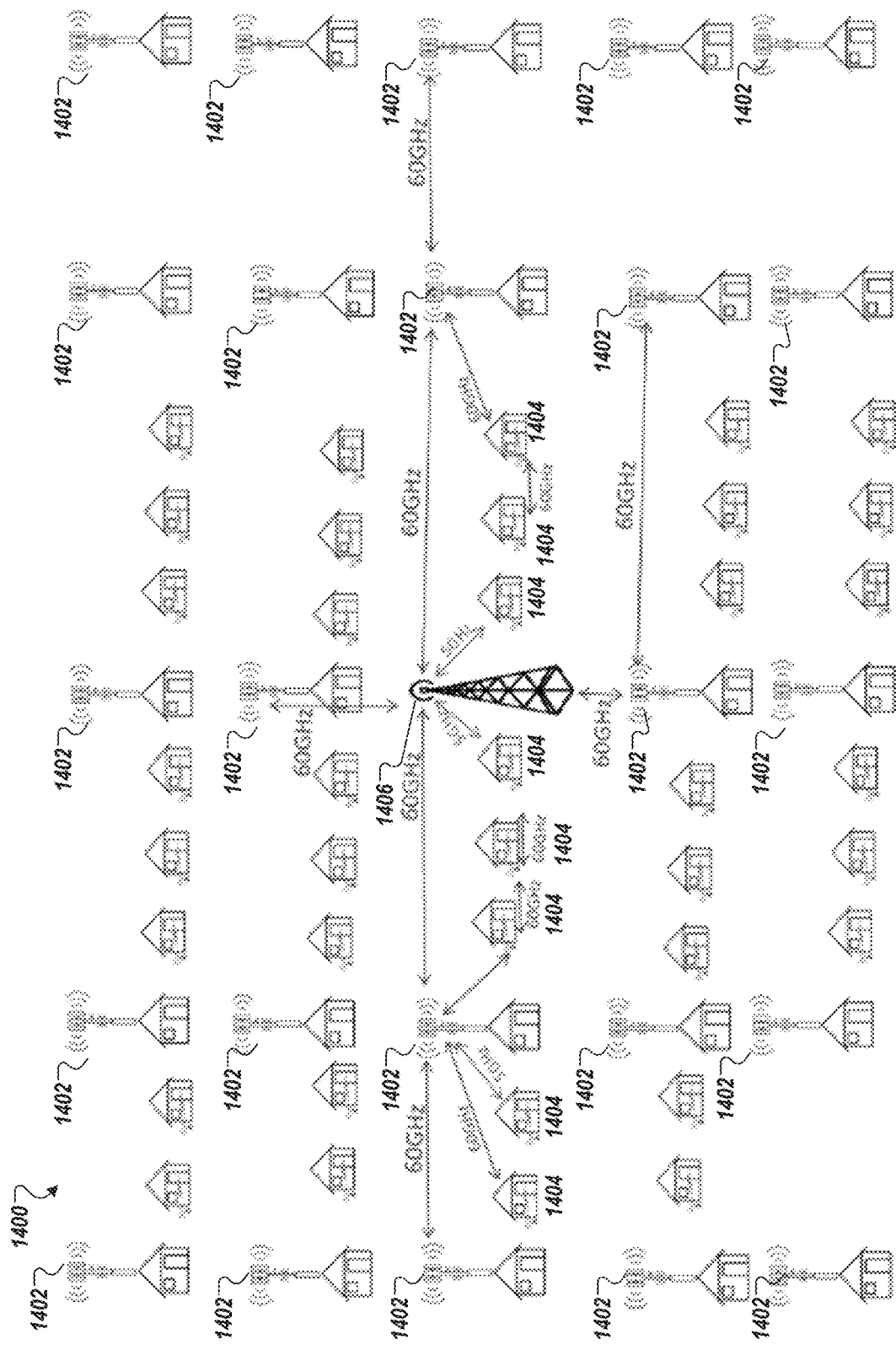
FIG. 14 illustrates a scaled WMN according to one embodiment.

Some modeling and simulation for a 1600-home neighborhood has shown that one BSN device to 24 HAN relay devices can be used to scale the WMN with acceptable network performance, such as illustrated in FIG. 14.

FIG. 14 illustrates a scaled WMN 1400 according to one embodiment. The scaled WMN 1400 includes twenty-five HAN relay devices 1402, multiple HAN devices 1404 (potentially 64 HAN devices per HAN relay device, one HAN device per home), and one BSN device 1406.

The HAN relay devices form a mesh and connect to the BSN device. Not all HAN relay devices need a LoS connection to the BSN device. Each BSN sector may support six HAN relay devices and each HAN relay sector can provide connectivity up to 16 homes. In this network configuration, the maximum number of hops from a BSN device to a HAN relay is 6, and the maximum number of hops from a HAN relay device to a HAN device is 16. Alternatively, other numbers of the respective devices may be used in other configurations of the WMN. As wireless is a shared medium, data injected into the overall network is shared among all homes served by a BSN device. A data contention ratio (CR) of 10:1 can be used so that data injected into the network is 1/10 the total home data rate within the sector. Using the CR value for the 1600-home example, such a network can support TCP data ranges of 50 Mbps to each home connecting via a 5 GHz link, and 100 Mbps to each home connecting via a 60 GHz link. The TCP data rate is 65% of the physical data rate. In theory, it is possible to double the per home data rates by adding a second BSN device, which double the capacity of the WMN.

In an ideal condition that does not account for 20 dB of foliage loss at 5.8 GHz band, the WMN can deliver data at more than 20 Mbps/house (TCP data rate per house) at 10:1 contention radio while keeping the percentage of houses hosting BSN devices to under 3%. In a non-ideal condition that includes 20 dB foliage loss (for a 10 m wide foliage at 5.8 GHz), the TCP data rate per house at 10:1 contention ratio drops to 4.7 Mbps while the percentage of houses hosting a BSN device increased to 9% for a single data stream case. For the maximum available data injection case, such as using dual data streams and dual 80 MHz channels, the percentage of houses hosting a BSN device increases to 18% while the TCP data rate per house at 10:1 contention ratio equals the injection data rate of 85 Mbps. To overcome foliage loss, a secondary AP location may be added to improve or avoid foliage blockage in its signal path. Alternatively, an optional or additional mesh link may be used between the neighboring houses to relay the signal to the house affected by the foliage problem. This solution may use a beam-steering antenna to be used for home nodes; when a home node detects poor signal level then its antenna beam will be redirected from pointing to the BSN device to a neighbor's HAN device, providing the strongest signal using a beam-steering antennas. (Hybrid PtMP and Mesh network). Alternatively, the impacted antenna could be moved to clear the foliage.

A linear PtP mesh network may use for a 60 GHz network since FCC mandates usage of PtP link for the 60 GHz band. In this PtP mesh network, the analysis showed that the maximum number of houses that can be connected on a single mesh injection node may not be limited by the maximum injection data rate but limited by the accumulated latency after n number of hops. The maximum number of hops with each mesh node consuming 20 Mbps/house data rate at 10:1 contention ratio yields more than 400 hops.

Since DIY installation of CPE transceiver (antennas of the HAN device 104) would entail mounting CPE transceivers on an external wall of a house, the installation may require complex electrical or carpentry work. To avoid customer performing complex electrical and carpentry work, Ethernet on power lines can be used to communicate ISP data from the HAN device 104 to inside the home. In another embodiment, an optical coupling through a window pane may be used.

Figure 15:
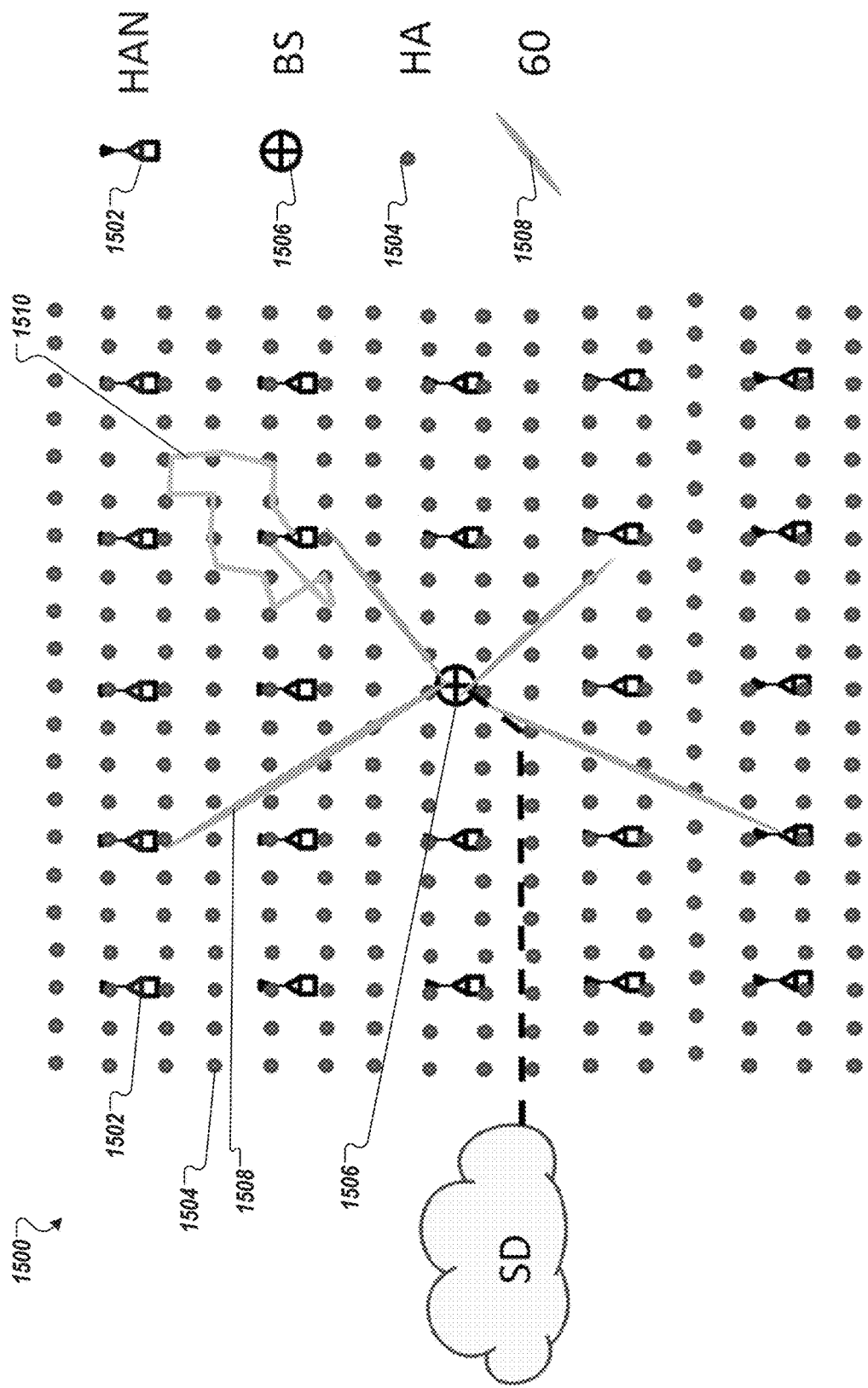
FIG. 15 is a network diagram of a WMN as a simplified single cell according to one embodiment.

FIG. 15 is a network diagram of a WMN 1500 as a simplified single cell according to one embodiment. The WMN 1500 includes multiple HAN relay devices 1502, multiple HAN devices 1504, and a BSN device 1506. The BSN device 1506 can wireless communicate with HAN relay devices 1502, such as over PtP wireless connections 1508. Any one of the HAN relay devices 1502 can communicate with a first HAN device 1504, which communicates with another HAN device 1504 and so on in a linear mesh network 1510.

In one embodiment, a WMN operating in a 60 GHz mesh network operation can include multiple network components: a BSN device, a HAN relay device, and a HAN device. A BSN has multiple 60 GHz transceivers with steerable antennas. In this example, four such transceivers cover the area surrounding the BSN tower forming the four sectors. A HAN relay is a node that forms a mesh network between the HAN relays within each sector. It also initiates a sub-mesh network connecting a HAN relay device to HAN devices within its surrounding area based on the associated connectivity parameters: data rate and link budgets, latency, etc. A HAN is a home node mounted on each subscriber's home providing internet connectivity to the subscriber. It also is used to provide the final mesh link connecting neighboring HAN devices.

As described herein the WMN can use dynamic mesh configuration. Each BSN transceiver can select any one of HAN relays within its sector as its first mesh node. Prior to the deployment of the BSN and HAN relays, the network control services (also referred to as SDN) evaluates the connection parameters, such as link budget, data rate, path loss, for the like, for all available links between BSN and HAN Relays within its sector and store the connection parameters into its data base for future reference. When the system is operating, SDN continues to review the connection status and choose the most optimum choice for the first BSN transceiver mesh node. Each HAN relay transceiver can also select any one of HAN relays within its reach as its first mesh node. Prior to the deployment of HAN relays, the SDN evaluates the connection parameters, such as link budget, data rate, path loss, or the like, for all available links between HAN relays and store the connection parameters into its data base for future reference. When the system is operating, SDN continues to review the connection status and choose the most optimum choice for the first HAN relay mesh node. Each HAN relay transceiver can also select any one of HAN within its reach as its first mesh node. Prior to the deployment of HAN relays, the SDN evaluates the connection parameters, such as link budget, data rate, path loss, or the like, for all available links between HAN relay and HAN then store the connection parameters into its data base for future reference. When the system is operating, SDN continues to review the connection status between a HAN relay device and HAN devices and choose the most optimum choice for the first HAN relay to HAN mesh node.

Overall, the described architectures should provide dynamically configuring multilevel mesh networks to overcome unintended and unexpected mesh link breakages within the network while shortening the network latency in its mesh network. The network performs the connectivity evaluation timely to improve the maximum performance, but it would initiate the full characterization whenever a new subscriber pattern emerges with addition or deletion of subscribers. The SDN should have lookup tables for all possible connections for all sub-mesh levels, so the reconfiguration of the connections would be done seamlessly. The key link connectivity parameters may include frequency, data rate, power level, path loss, delay time, HAN data consumption rate, connected node, blocked nodes, available nodes, and new or deleted node.

Figure 16A:
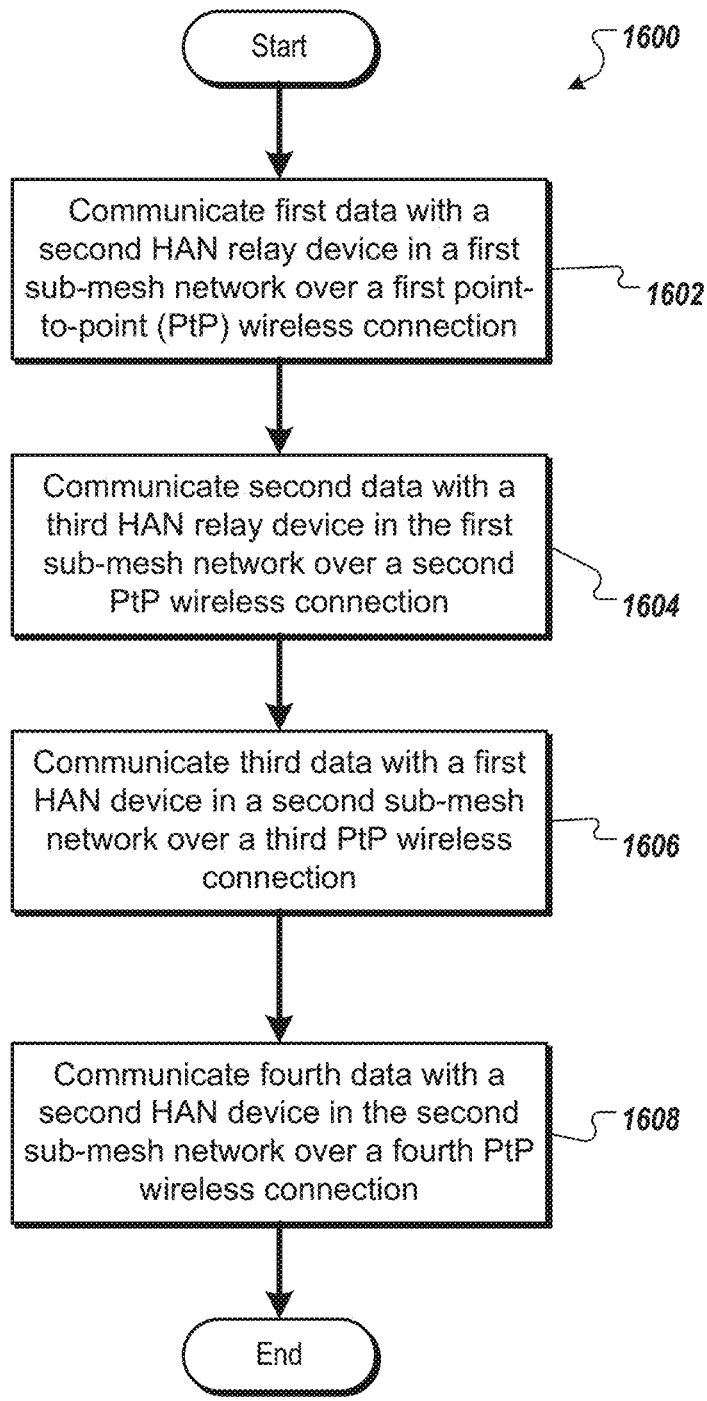
FIG. 16A is a flow diagram of a method of communicating data over wireless links in a WMN according to one embodiment.

FIG. 16A is a flow diagram of a method 1600 of communicating data over wireless links in a WMN according to one embodiment. The method 1600 may be at least partially performed by processing logic that may include hardware (e.g., circuitry, dedicated logic, programmable logic, microcode, etc.), software (e.g., instructions executed by a processing device), firmware, or any combination thereof. The method 1600 may be performed by processing logic of HAN relay device as described herein. Alternatively, any of the network devices described herein may perform some or all of the method 1600 or similar operations in the respective devices to communicate data in the WMN.

Referring to FIG. 16A, the method 1600 begins with the processing logic communicating, by a first radio coupled to a first beam-steering antenna, first data with a another HAN relay device in a first sub-mesh network over a first point-to-point (PtP) wireless connection (block 1602). The processing logic communicates, by a second radio coupled to a second beam-steering antenna, second data with a third HAN relay device in the first sub-mesh network over a second PtP wireless connection (block 1604). The processing logic communicates, by a third radio coupled to a third beam-steering antenna, third data with a first HAN device in a second sub-mesh network over a third PtP wireless connection (block 1606). The processing logic communicates, by a fourth radio coupled to a fourth beam-steering antenna, fourth data with a second HAN device in the second sub-mesh network over a fourth PtP wireless connection (block 1608.

In a further embodiment, the processing logic communicates, by a fifth radio coupled to a fifth beam-steering antenna, fifth data with a third HAN device in the second sub-mesh network over a fifth PtP wireless connection and communicates, by a sixth radio coupled to a sixth beam-steering antenna, sixth data with a fourth HAN device in the second sub-mesh network over a sixth PtP wireless connection.

In another embodiment, the processing logic communicates, by a seventh radio coupled to a first antenna (e.g., fixed-beam antenna), seventh data with one or more of the first HAN device or the second HAN device over a first point-to-multiple-points (PtMP) wireless connection. The processing logic communicates, by an eighth radio coupled to a second antenna, eighth data with one or more of the first HAN device or the second HAN device over a second PtMP wireless connection. The processing logic communicates, by a ninth radio coupled to a third antenna, ninth data with one or more of the first HAN device or the second HAN device over a third PtMP wireless connection. The processing logic communicates, by a tenth radio coupled to a fourth antenna, tenth data with one or more of the first HAN device or the second HAN device over a fourth wireless connection.

In another embodiment, the processing logic communicates, by a fifth radio coupled to a fifth beam-steering antenna, fifth data with a base station node (BSN) device over a fifth PtP wireless connection.

In another embodiment, the processing logic communicates, by a fifth radio coupled to an antenna, fifth data with one or more of the first HAN device or the second HAN device over a point-to-multiple-points (PtMP) wireless connection. In one embodiment, the processing logic communicates the third data over with the first HAN device over the third PtP wireless connection at frequencies in a 60 GH band. The processing logic communicates, by a fifth radio coupled to an antenna, fifth data with the first HAN device over a point-to-multiple-points (PtMP) wireless connection at frequencies in a 5 GHz band.

Figure 16B:
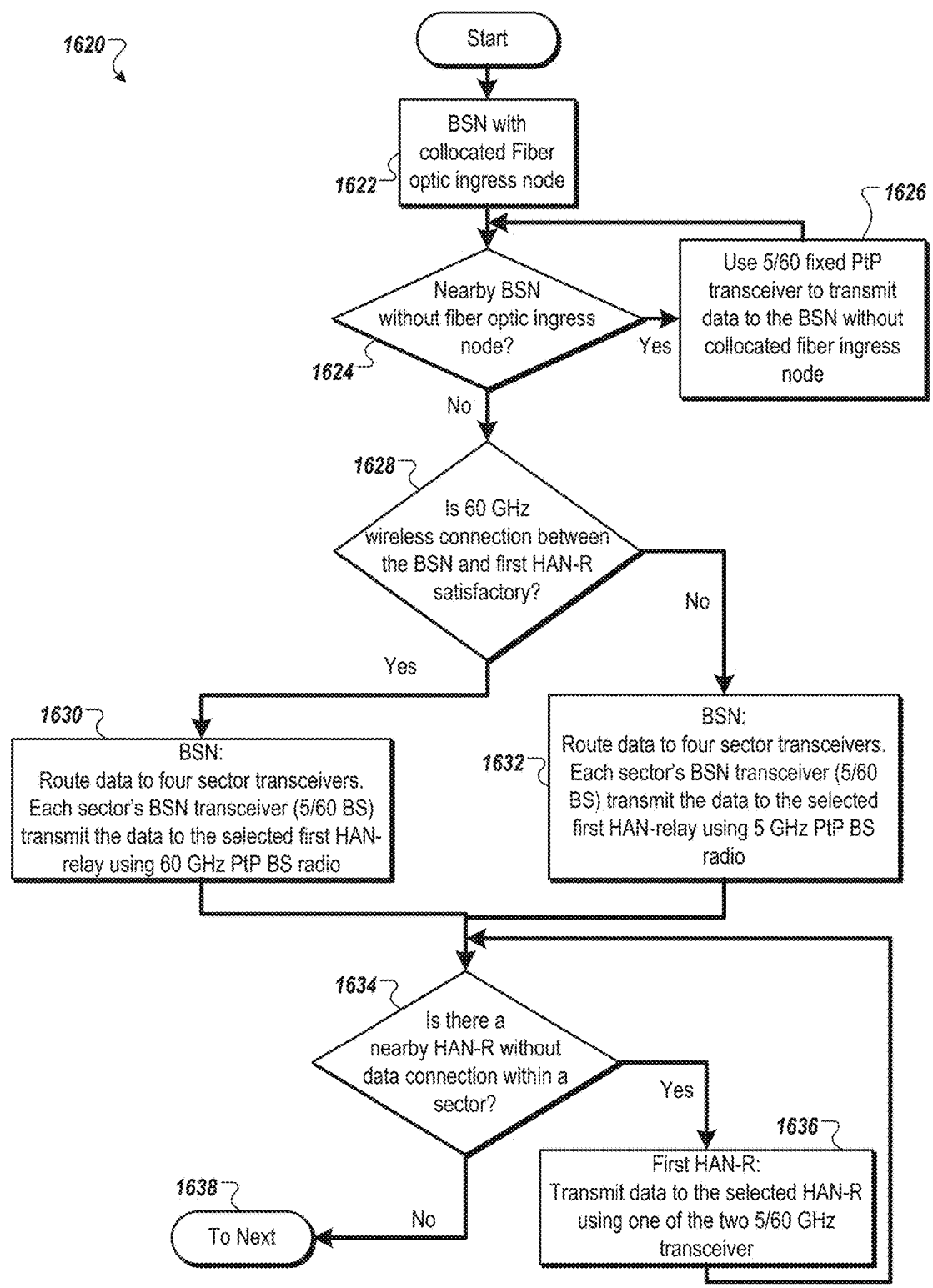
FIGS. 16B-16C is a flow diagram of a method of communicating data over wireless links in a WMN according to one embodiment.
Figure 16C:
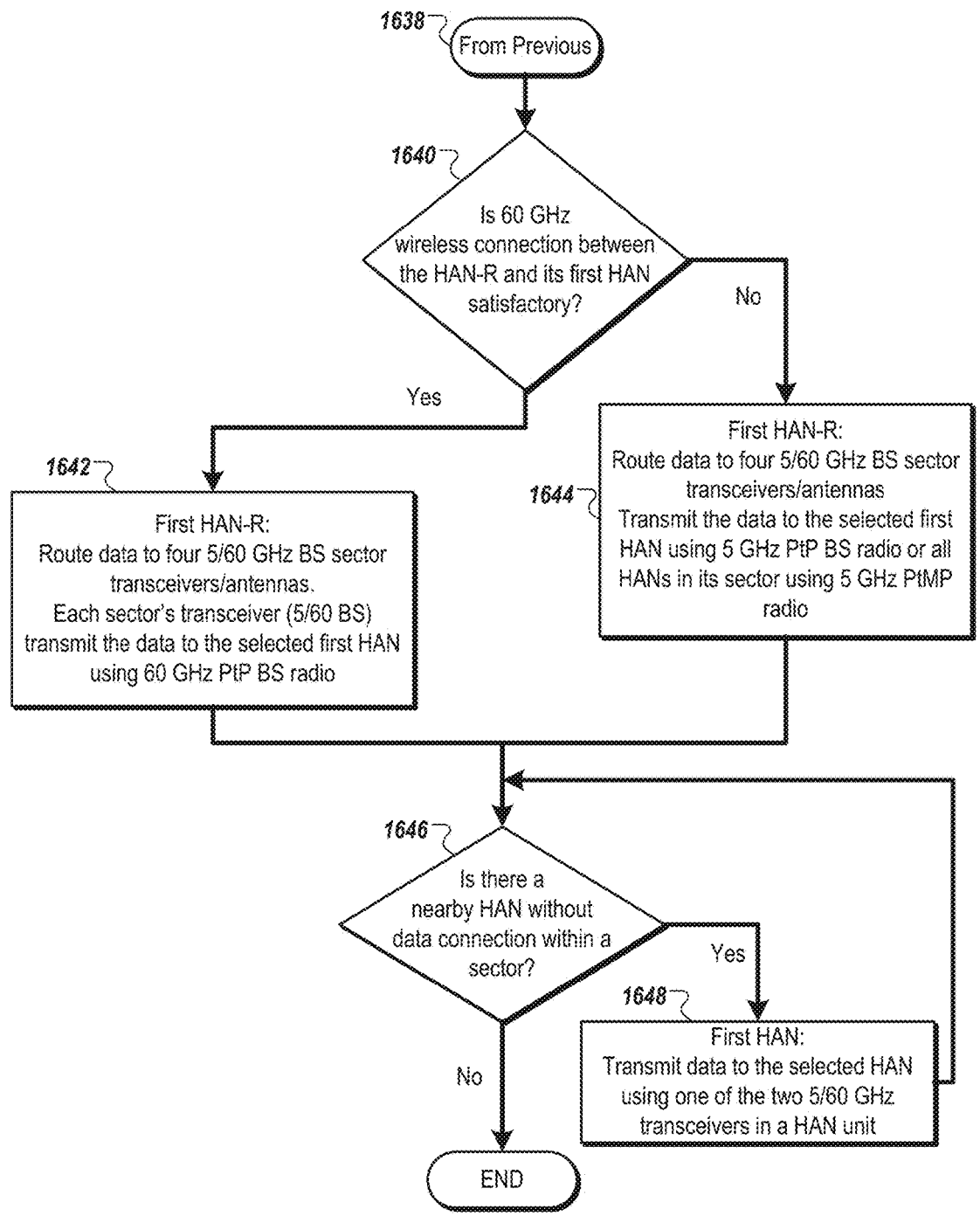

FIGS. 16B-16C is a flow diagram of a method 1620 of communicating data over wireless connections in a WMN according to one embodiment. The method 1620 may be at least partially performed by processing logic that may include hardware (e.g., circuitry, dedicated logic, programmable logic, microcode, etc.), software (e.g., instructions executed by a processing device), firmware, or any combination thereof. The method 1600 may be performed by processing logic of the respective network devices as described herein.

Referring to FIG. 16B, the method 1620 begins with the processing logic of a BSN device establishes a wired connection with a collocated fiber optic ingress node (block 1622). The processing logic determines if there is a nearby without coexisting optical fiber ingress node (block 1624). If there is a nearby BSN without fiber optic ingress node at block 1624, the processing logic uses the 5/60 fixed PtP transceiver to transmit data to the BSN without collocated fiber ingress node (block 1626). If there is no nearby BSN without fiber optic ingress node at block 1624, the processing logic determines if there is a 60 GHz wireless connection between the BSN device and a first HAN relay device that is satisfactory (block 1628). If so, the processing logic of the BSN device routes data to four sector transceivers and each sector's BSN transceiver (5/60 beam steering (BS)) transmits the data to the selected first HAN relay device using 60 GHz PtP BS radio (block 1630). If the 60 GHz wireless connection is not satisfactory at block 1628, the processing logic of the BSN device routes data to the four sector transceivers and each sector's BSN transceiver (5/60 BS) transmits the data to the selected first HAN relay device using 5 GHz PtP BS radio (block 1632). At block 1634, the processing logic determines if there is any nearby HAN relay device without data connection within a sector. If so, the processing logic transmits data to the selected HAN relay device using one of the two 5/60 GHz transceivers (block 1636), and returns to block 1634. If at block 1634 there is no nearby HAN relay device without data connection with the sector, the processing logic continues to block 1638, illustrated in FIG. 16C.

Referring to FIG. 16C, the processing logic continues from block 1638 to block 1640 at which the processing logic determines if the 60 GHz wireless connection between the first HAN relay device and a first HAN device is satisfactory. If satisfactory, the processing logic routes data to the four 5/60 GHz BS sector transceivers/antennas and each sector's transceiver (5/60 BS) transmits the data to the selected first HAN device using 60 GHz PtP BS radio (block 1642). If the 60 GHz wireless connection is not satisfactory at block 1640, the processing logic routes data to four 5/60 GHz BS sector transceivers/antennas each sector's transceiver (5/60 BS) transmits the data to the selected first Han device using 5 GHz PtP BS radio, or alternatively, transmits the data to all HAN devices in its sector using 5 GHz PtMP radio (block 1644). At block 1646, the processing logic determines if there is a nearby HAN device without data connection within a sector. IF there is a nearby HAN device without data connection, the processing logic transmits data to the selected HAN device using one of the two 5/60 GHz transceivers in a HAN unit (block 1648), and the processing logic returns to block 1646. If at block 1646 there is no nearby HAN without data connection, the method 1620 ends.

In one embodiment, the selection process for choosing the selected HAN relay device and selected HAN device, such as at blocks 1630, 163, 1636, and 1648 described above, may may be based on quality of service of each network link which ultimately governs quality of service to customers. Such selection criteria could be based on network latency, data rate, or the like.

Figure 17:
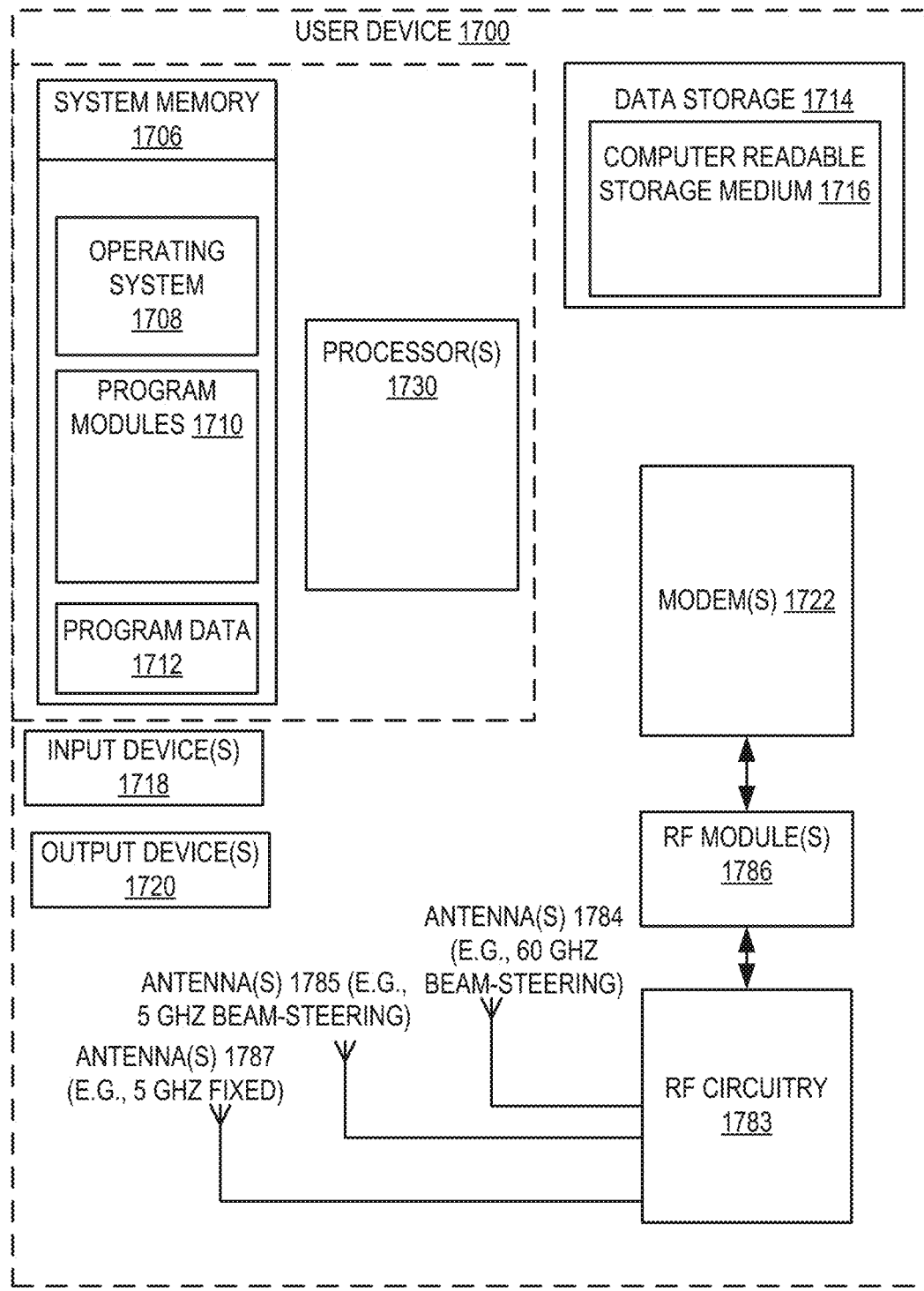
FIG. 17 is a block diagram of a network hardware device according to one embodiment.

FIG. 17 is a block diagram of a network hardware device 1700 according to one embodiment. The network hardware device 1700 may correspond to any one of the network hardware device described herein. The network hardware device 1700 includes one or more processor(s) 1730, such as one or more CPUs, microcontrollers, field programmable gate arrays, or other types of processors. The network hardware device 1700 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of methods to control operation of the network hardware device 1700. The network hardware device 1700 performs functions by using the processor(s) 1730 to execute instructions provided by the system memory 1706.

The network hardware device 1700 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 may reside, completely or at least partially, within the computer-readable storage medium 1716, system memory 1706 and/or within the processor(s) 1730 during execution thereof by the network hardware device 1700, the system memory 1706 and the processor(s) 1730, also constituting computer-readable media. The network hardware device 1700 may also include one or more input devices 1718 (keyboard, mouse device, specialized selection keys, etc.) and one or more output devices 1720 (displays, printers, audio output mechanisms, etc.).

The network hardware device 1700 further includes a modem 1722 to allow the network hardware device 1700 to communicate via a wireless connections (e.g., such as provided by the wireless communication system) with other computing devices, such as remote computers, an item providing system, and so forth. The modem 1722 can be connected to one or more RF modules 1786. The RF modules 1786 may be a WLAN module, a WAN module, PAN module, GPS module, a 60 GHz radio, a 5 GHz radio, or the like, as described herein. The antenna structures (antenna(s) 1784, 1785, 1787) are coupled to the RF circuitry 1783, which is coupled to the modem 1722. The RF circuitry 1783 may include radio front-end circuitry, antenna switching circuitry, impedance matching circuitry, or the like. The antennas 1784 may be GPS antennas, NFC antennas, other WAN antennas, WLAN or PAN antennas, beam-steering antennas, fixed-beam antennas, or the like. The modem 1722 allows the network hardware device 1700 to handle both voice and non-voice communications (such as communications for text messages, multimedia messages, media downloads, web browsing, etc.) with a wireless communication system. The modem 1722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc.

The modem 1722 may generate signals and send these signals to antenna(s) 1784 of a first type (e.g., 60 GHz beam-steering), antenna(s) 1785 of a second type (e.g., 5 GHz beam-steering), and/or antenna(s) 1787 of a third type (e.g., 5 GHz fixed-beam), via RF circuitry 1783, and RF module(s) 1786 as descried herein. Antennas 1784, 1785, 1787 may be configured to transmit in different frequency bands and/or using different wireless communication protocols. The antennas 1784, 1785, 1787 may be directional, omnidirectional, or non-directional antennas. In addition to sending data, antennas 1784, 1785, 1787 may also receive data, which is sent to appropriate RF modules connected to the antennas. One of the antennas 1784, 1785, 1787 may be any combination of the antenna structures described herein.

In one embodiment, the network hardware device 1700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh network devices of the WMN and the second wireless connection may be associated with serving a content file to a client consumption device, as described herein.

Though a modem 1722 is shown to control transmission and reception via antenna (1784, 1785, 1787), the network hardware device 1700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless mesh network (WMN) for broadband connectivity to broadband Internet infrastructure, the WMN comprising:
   a first sub-mesh network comprising a plurality of home access node (HAN) devices, each HAN device of the plurality of HAN devices being individually connected to a building in a geographic area, wherein a first HAN device, of the plurality of HAN devices, is an access point to provide Internet connectivity to a client consumption device located in a first building to which the first HAN device is connected, wherein the first HAN device comprises a first radio to communicate data with a second HAN device of the plurality of HAN devices in the first sub-mesh network;
   a second sub-mesh network comprising a plurality of HAN relay devices, each HAN relay device of the plurality of HAN relay devices being individually connected to structures in the geographic area, wherein a first HAN relay device of the plurality of HAN relay devices comprises:
      a first set of two radios, each of the first set of two radios coupled to a beam-steering antenna and each of the first set of two radios to establish a point-to-point (PtP) wireless connection over which the first HAN relay device communicates data with a second HAN relay device of the plurality of HAN relay devices in the second sub-mesh network; and
      a second set of four radios, each of the second set of four radios coupled to a beam-steering antenna and each of the second set of four radios to establish a PtP wireless connection over which the first HAN relay device communicates data with at least one of the plurality of HAN devices in the first sub-mesh network; and
   a base station node (BSN) device connected to a tower in the geographic area, and wherein the BSN device comprises:
      a first radio to communicate data with a server of a content delivery network (CDN) over at least one of a first wired connection or a PtP wireless connection; and
      a set of four radios, each of the set of four radios coupled to a beam-steering antenna and each of the set of four radios to establish a PtP wireless connection over which the BSN device wirelessly communicates data with the first HAN relay device.

2. The WMN of claim 1, wherein the first HAN relay device further comprises a third set of four radios, each of the third set of four radios coupled to an antenna and each of the third set of four radios to establish a point-to-multiple-points (PtMP) wireless connection over which the first HAN relay device communicates data with at least some of the plurality of HAN devices in the first sub-mesh network, wherein the PtMP wireless connection is a backup communication link for the PtP wireless connection.

3. The WMN of claim 1, wherein the BSN device is one of multiple gateway devices to provide Internet connectivity to the plurality of HAN devices and the plurality of HAN relay devices within the WMN.

4. The WMN of claim 1, wherein the BSN device is a single gateway device to provide Internet connectivity to the plurality of HAN devices and the plurality of HAN relay devices within the WMN.

5. A home access node (HAN) relay device comprising:
   a first set of radios, each of the first set of radios coupled to a beam-steering antenna and each of the first set of radios to establish a first point-to-point (PtP) wireless connection over which the HAN relay device communicates digital content data with a second HAN relay device in a first sub-mesh network of HAN relay devices in a wireless mesh network (WMN), wherein:
      (i) at least one radio of the first set of radios is to establish a third PtP wireless connection over which the HAN relay device receives the digital content data from a base station node (BSN) device;
      (ii) the BSN device is an ingress point for digital content data into the first sub-mesh network of HAN relay devices;
      (iii) the HAN relay devices communicates the digital content data amongst each other; and
      (iv) each of the HAN relay devices is coupled to at least one of a plurality of HAN devices that form a second sub-mesh network and communicates the digital content data amongst each other; and
   a second set of radios, each of the second set of radios coupled to a beam-steering antenna and each of the second set of radios to establish a second PtP wireless connection over which the HAN relay device communicates the digital content data with one of a plurality of HAN devices in a second sub-mesh network in the WMN.

6. The HAN relay device of claim 5, further comprising a third set of radios, each of the third set of radios coupled to an antenna and each of the third set of radios to establish a point-to-multiple-points (PtMP) wireless connection over which the HAN relay device communicates the digital content data with at least some of the plurality of HAN devices in the second sub-mesh network of HAN devices.

7. The HAN relay device of claim 5, wherein the first set of radios comprises a first radio and a second radio, wherein the second set of radios comprises a third radio, a fourth radio, a fifth radio, and a sixth radio, wherein the HAN relay device further comprises:
   a first beam-steering antenna coupled to the first radio;
   a second beam-steering antenna coupled to the second radio;
   a third beam-steering antenna coupled to the third radio, wherein the third beam-steering antenna to radiate electromagnetic energy to communicate digital content data with a first HAN device, of the plurality of HAN devices, located in a first sector of a geographic area;
   a fourth beam-steering antenna coupled to the fourth radio, wherein the fourth beam-steering antenna to radiate electromagnetic energy to communicate digital content data with a second HAN device, of the plurality of HAN devices, located in a second sector of the geographic area;
   a fifth beam-steering antenna coupled to the fifth radio, wherein the fifth beam-steering antenna to radiate electromagnetic energy to communicate digital content data with a third HAN device, of the plurality of HAN devices, located in a third sector of the geographic area; and
   a sixth beam-steering antenna coupled to the sixth radio, wherein the sixth beam-steering antenna to radiate electromagnetic energy to communicate digital content data with a fourth HAN device, of the plurality of HAN devices, located in a fourth sector of the geographic area.

8. The HAN relay device of claim 7, wherein the first set and the second set of radios radiate electromagnetic energy in a 60 GHz band.

9. The HAN relay device of claim 7, wherein the first set and the second set of radios radiate electromagnetic energy in a 5 GHz band.

10. The HAN relay device of claim 7, wherein the first set and the second set of radios radiate electromagnetic energy in both a 5 GHz band and a 60 GHz band.

11. The HAN relay device of claim 7, further comprising:
a seventh radio coupled to a first fixed-beam antenna, the first fixed-beam antenna to radiate electromagnetic energy to communicate digital content data over a first backup wireless connection between the HAN relay device and the first HAN device located in the first sector of the geographic area;
an eighth radio coupled to a second fixed-beam antenna, the second fixed-beam antenna to radiate electromagnetic energy to communicate digital content data over a second backup wireless connection between the HAN relay device and the second HAN device located in the second sector of the geographic area;
a ninth radio coupled to a third fixed-beam antenna, the third fixed-beam antenna to radiate electromagnetic energy to communicate digital content data over a third backup wireless connection between the HAN relay device and the third HAN device located in the third sector of the geographic area; and
a tenth radio coupled to a fourth fixed-beam antenna, the fourth fixed-beam antenna to radiate electromagnetic energy to communicate digital content data over a fourth backup wireless connection between the HAN relay device and the fourth HAN device located in the first sector of the geographic area.

12. The HAN relay device of claim 11, wherein the first radio, the second radio, the third radio, the fourth radio, the fifth radio, and the sixth radio radiate electromagnetic energy via the first beam-steering antenna, the second beam-steering antenna, the third beam-steering antenna, the fourth beam-steering antenna, the fifth beam-steering antenna, and the beam-steering antenna, respectively at frequencies in a 60 GHz band, and wherein the seventh radio, the eighth radio, the ninth radio, and the tenth radio radiate electromagnetic energy via the first fixed-beam antenna, the second fixed-beam antenna, the third fixed-beam antenna, and the fourth fixed-beam antenna, respectively at frequencies in a 5 GHz band.

13. The HAN relay device of claim 5, further comprising a transceiver to communicate digital content data with the BSN device over a wired connection, wherein the HAN relay device and the BSN device are connected to a same tower in a geographic area, wherein the BSN device comprises a wired or wireless connection to a server of a content delivery network (CDN).

14. The HAN relay device of claim 5, further comprising a first radio to communicate digital content data with a server of a content delivery network (CDN) over at least one of a first wired connection or a PtP wireless connection.

15. A method of operating a home access node (HAN) relay device in a wireless mesh network (WMN), wherein the WMN includes a first sub-mesh network and a second sub-mesh network, the method comprising:
communicating, by a first radio coupled to a first beam-steering antenna, first digital content data with a second HAN relay device in the first sub-mesh network over a first point-to-point (PtP) wireless connection;
communicating, by a second radio coupled to a second beam-steering antenna, second digital content data with a third HAN relay device in the first sub-mesh network over a second PtP wireless connection;
communicating, by a third radio coupled to a third beam-steering antenna, third digital content data with a first HAN device in the second sub-mesh network over a third PtP wireless connection; and
communicating, by a fourth radio coupled to a fourth beam-steering antenna, fourth digital content data with a second HAN device in the second sub-mesh network over a fourth PtP wireless connection; and
communicating, by a fifth radio coupled to a fifth beam-steering antenna, fifth digital content data with a base station node (BSN) device over a fifth PtP wireless connection, wherein the BSN device is an ingress point for digital content into the first sub-mesh network of HAN relay devices, wherein the HAN relay devices communicate the digital content data amongst each other, wherein each of the HAN relay devices is coupled to at least one of the HAN devices that form the second sub-mesh network and communicate the digital content amongst each other.

16. The method of claim 15, further comprising:
communicating, by a seventh radio coupled to a first fixed-beam antenna, seventh digital content data with one or more of the first HAN device or the second HAN device over a first point-to-multiple-points (PtMP) wireless connection;
communicating, by a eighth radio coupled to a second fixed-beam antenna, eighth digital content data with one or more of the first HAN device or the second HAN device over a second PtMP wireless connection;
communicating, by a ninth radio coupled to a third fixed-beam antenna, ninth digital content data with one or more of the first HAN device or the second HAN device over a third PtMP wireless connection; and
communicating, by a tenth radio coupled to a fourth fixed-beam antenna, tenth digital content data with one or more of the first HAN device or the second HAN device over a fourth wireless connection.

17. The method of claim 15, wherein the BSN device connected to a tower in a geographic area and comprising a wired or wireless connection to a server of a content delivery network (CDN).

18. The method of claim 15, further comprising communicating, by a fifth radio coupled to an antenna, fifth digital content data with the first HAN device and the second HAN device over a point-to-multiple-points (PtMP) wireless connection.

19. The method of claim 15, wherein the communicating the third digital content data comprises communicating the third digital content data with the first HAN device over the third PtP wireless connection at frequencies in a 60 GH band, and wherein the method further comprises communicating, by a sixth radio coupled to an antenna, sixth digital content data with the first HAN device over a point-to-multiple-points (PtMP) wireless connection at frequencies in a 5 GHz band.

* * * * *